United States Patent
Gerasopoulos et al.

(10) Patent No.: US 12,021,231 B2
(45) Date of Patent: Jun. 25, 2024

(54) PROCESSES FOR MAKING NIOBIUM-BASED ELECTRODE MATERIALS

(71) Applicant: The Johns Hopkins University, Baltimore, MD (US)

(72) Inventors: Konstantinos Gerasopoulos, Gambrills, MD (US); Dajie Zhang, Baltimore, MD (US); Matthew W. Logan, Columbia, MD (US)

(73) Assignee: The Johns Hopkins University, Baltimore, MD (US)

( * ) Notice: Subject to any disclaimer, the term of this patent is extended or adjusted under 35 U.S.C. 154(b) by 0 days.

(21) Appl. No.: 18/140,670

(22) Filed: Apr. 28, 2023

(65) Prior Publication Data

US 2023/0299279 A1 Sep. 21, 2023

Related U.S. Application Data

(62) Division of application No. 17/346,495, filed on Jun. 14, 2021, now Pat. No. 11,682,760.

(Continued)

(51) Int. Cl.
*H01M 4/485* (2010.01)
*C01G 33/00* (2006.01)
(Continued)

(52) U.S. Cl.
CPC .......... *H01M 4/485* (2013.01); *C01G 33/006* (2013.01); *H01M 4/663* (2013.01);
(Continued)

(58) Field of Classification Search
CPC .. H01M 4/485; H01M 4/663; H01M 10/0525; H01M 10/0565; H01M 2004/027; H01M 2300/0082; C01G 33/006; C01G 41/00; C01G 33/00; C01P 2002/72; C01P 2002/85; C01P 2004/03; C01P 2004/54; C01P 2004/61; C01P 2006/40; C01P 2002/76; C01P 2002/77; C01P 2006/80; Y02E 60/10

See application file for complete search history.

(56) References Cited

PUBLICATIONS

Lou et al., New anode material for lithium-ion batteries: aluminum niobate (AlNb11O29), ACS Appl. Mater. Interfaces, 2019, 11, 6089-6096) (Year: 2019).*

(Continued)

*Primary Examiner* — Daniel S Gatewood
(74) *Attorney, Agent, or Firm* — Noah J. Hayward

(57) ABSTRACT

Processes for preparing a niobate material are provided, in which the processes include the following steps: (i) providing a niobium-containing source; (ii) providing a transitional metal source (TMS), a post-transitional metal source (PTMS), or both; (iii) dissolving (a) the niobium-containing source, and (b) the TMS, the PTMS, or both in an aqueous medium to form an intermediate solution; (iv) forming an intermediate paste by admixing an inert support material with the intermediate solution; (v) optionally coating the intermediate paste on a support substrate; and (vi) removing the inert support material by subjecting the intermediate paste to a calcination process and providing a transition-metal-niobate (TMN) and/or a post-transition-metal-niobate (PTMN). Anodes including a TMN and/or PTMN are also provided.

17 Claims, 24 Drawing Sheets

Related U.S. Application Data

(60) Provisional application No. 63/061,282, filed on Aug. 5, 2020.

(51) Int. Cl.
    *H01M 4/02*           (2006.01)
    *H01M 4/66*           (2006.01)
    *H01M 10/0525*      (2010.01)
    *H01M 10/0565*      (2010.01)

(52) U.S. Cl.
    CPC ... *H01M 10/0525* (2013.01); *H01M 10/0565* (2013.01); *C01P 2002/72* (2013.01); *C01P 2002/85* (2013.01); *C01P 2004/03* (2013.01); *C01P 2004/54* (2013.01); *C01P 2004/61* (2013.01); *C01P 2006/40* (2013.01); *H01M 2004/027* (2013.01); *H01M 2300/0082* (2013.01)

(56) References Cited

PUBLICATIONS

Okumura et al., Structure and catalysis of layered Nb-W oxide constructed by the self-assembly of nanofibers, Catalysis Today 2013, 204, 197-203 (Year: 2013).*

Lin et al., Defective Ti2Nb10O27.1: an advanced anode material for lithium-ion batteries, Scientific Reports | 5:17836 | DOI: 10/1038/srep17836 (Year: 2015).*

Xiaoming Lou et al., "New Anode Material for Lithium-Ion Batteries: Aluminum Niobate (AlNb11O29)," ACS Appl. Mater. Interfaces, 11, 2019, pp. 6089-6096.

Kaza Okumura et al., "Structure and catalysis of layered Nb—W oxide constructed by the self-assembly of nanofibers," Catalysis Today, 204, 2013. pp. 197-203.

* cited by examiner

PROCESSES FOR MAKING NIOBIUM-BASED ELECTRODE MATERIALS

CROSS-REFERENCE TO RELATED APPLICATIONS

This application is a divisional of prior-filed, co-pending U.S. Nonprovisional application Ser. No. 17/346,495 filed on Jun. 14, 2021, which claims priority to and the benefit of prior-filed U.S. Provisional Application No. 63/061,282 filed on Aug. 5, 2020, the content of each of which is herein incorporated by reference in its entirety.

TECHNICAL FIELD

Embodiments of the presently-disclosed invention relate generally to processes for preparing a niobate material via a wet chemistry route, in which the processes include dissolution of a niobium-containing source and a transitional metal source (TMS), and/or a post-transitional metal source (PTMS) in an aqueous medium to form an intermediate solution followed by forming an intermediate paste by admixing an inert support material with the intermediate solution. The inert support material may be removed by subjecting the intermediate paste to a calcination process to provide a transition-metal-niobate (TMN) and/or a post-transition-metal-niobate (PTMN). Anodes including a TMN and/or PTMN are also provided.

BACKGROUND

Lithium-ion batteries (LIBs) have set themselves apart in recent years due to their high gravimetric and volumetric energy density, high operating potential, and long cycle life, and are thus being employed in a wide range of energy storage applications, such as portable electronics and electric vehicles. Efforts to further increase energy and power density have equally focused on both new anode and cathode materials with desirable properties such as high capacity, high rate capability, excellent cycle life, and safe operating potential. Interestingly, while several commercial cathode materials are currently used in various cell designs and applications (for example, $LiCoO_2$ (LCO), $LiFePO_4$ (LFP), $LiMn_2O_4$ (LMO), $LiNi_{0.8}Co_{0.15}Al_{0.05}O_2$ (NCA), $LiNi_{0.8}Co_{0.10}Mn_{0.10}O_2$, etc.), graphite and $Li_4Ti_5O_{12}$ (LTO) are the only anodes that are being used commercially in large scale, despite ongoing efforts for the widespread commercialization of emerging materials such as Si, Sn, and Li-metal (in rechargeable cells).

Graphite-based materials are extensively used in state-of-the-art LIBs due to their relatively high theoretical capacity (372 mAh $g^{-1}$), low operating potential (average discharge potential: about 0.12V vs. $Li^+/Li$), and low cost (<$15/kg). However, given that the intercalation potential for graphite is very close to that of Li-metal plating (<0.1V vs. $Li^+/Li$), graphite batteries suffer from poor charge rate performance and pose a safety risk from the combination of flammable organic electrolytes and the potential formation of lithium-dendrites that can cause short circuits during cycling at low temperature or/and under fast charge conditions. These shorts can increase internal temperature beyond the thermal stability of the flammable organic electrolytes, leading to catastrophic failure. The decomposition of reactive electrolytes at low potentials forms a thick solid-electrolyte interphase (SEI) layer further limiting rate capability due to poor Li-ion diffusion. On the other hand, LTO has a relatively high intercalation potential (about 1.55V vs. $Li/Li^+$) that avoids the formation of lithium dendrites, which, combined with the "zero-strain" in LTO during lithiation/de-lithiation, enable this material to achieve superior rate capability and cycle-life performance with safe operation. Unfortunately, LTO's limited theoretical capacity (175 mAh $g^{-1}$) and high operating potential are unsuitable for most applications as they result in substantially lower energy density and limit its utility to applications where fast charging, high power, long cycle life, and high-level safety are required.

This lack of commercial alternatives for next-generation LIBs has motivated the energy storage community to investigate new materials that combine the performance benefits of graphite and LTO. Niobium oxides have emerged as promising alternative anodes because they simultaneously possess a high theoretical specific capacity (374-403 mAh g-1) and volumetric capacities that are higher than graphite and LTO. For example, the volumetric capacity of $TiNb_2O_7$ (TNO) is double that of graphite (1680 vs. 840 mAh $cm^{-3}$, respectively), and even higher than that of LTO (610 mAh $cm^{-3}$). A limitation of TNO, however, is that its electronic conductivity is low and it consequently requires carbon coating for good electrochemical performance. In fact, although niobium oxides have a safe operating potential >0.8 V, the electrical conductivity limitation prevents widespread adoption.

Recently, the investigation of inexpensive aluminum-based niobates ($AlNb_{11}O_{29}$ and $Al_{0.5}Nb_{24.5}O_{62}$) revealed high $Li^+$ diffusivity by increasing the size of the interstitial sites and superior cycle stability as a consequence of ultra-high Al—O bond energies (511 kJ mol-1) and the edge-sharing nature of the metal-center octahedra. Laboratory scale exploration, although insightful, has been limited to low active material loading ($\leq 1.5$ mg $cm^{-2}$) and content in the compositions (65 wt. %).

BRIEF SUMMARY

Certain embodiments according to the invention provide processes for preparing a niobate material are provided, in which the processes include the following steps: (i) providing a niobium-containing source; (ii) providing a transitional metal source (TMS), a post-transitional metal source (PTMS), or both; (iii) dissolving (a) the niobium-containing source, and (b) the TMS, the PTMS, or both in an aqueous medium to form an intermediate solution; (iv) forming an intermediate paste by admixing an inert support material with the intermediate solution; (v) optionally coating the intermediate paste on a support substrate; and (vi) removing the inert support material by subjecting the intermediate paste to a calcination process and providing a transition-metal-niobate (TMN) and/or a post-transition-metal-niobate (PTMN).

In another aspect, the present invention provides an anode including an anode-composition comprising an active anode species. The active anode species comprises at least one niobate compound comprising at least one transition-metal-niobate (TMN), at least one post-transition-metal-niobate (PTMN), or both, in which the anode composition comprises from about 80 wt. % to about 95 wt. % of the at least one niobate compound.

In yet another aspect, the present invention provides an electrochemical cell including (i) an anode, (ii) a cathode, and an electrolyte positioned between and in contact with the anode and the cathode. The anode includes an anode-composition comprising an active anode species comprising at least one niobate compound comprising at least one transition-metal-niobate (TMN), at least one post-transitionmetal-niobate (PTMN), or both. The anode composition comprises from about 80 wt. % to about 95 wt. % of the at least one niobate compound.

BRIEF DESCRIPTION OF THE DRAWING

The invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. Like numbers refer to like elements throughout, and wherein:

FIGS. 16A-F illustrate properties upon nail penetration being performed on fully charged 2.5 Wh full cells, in which FIGS. 16A-C illustrate the charged-discharge plots for the first two formation cycles in cells with glass fiber separator, while FIGS. 16D-F illustrate thermal imaging snapshots of nail penetration experiments, showing the highest recorded temperature.

DETAILED DESCRIPTION

Non-limiting, example embodiments will be described more fully hereinafter with reference to the accompanying drawings, in which some, but not all embodiments of the invention are shown. Indeed, the present invention may be embodied in many different forms and should not be construed as limited to the embodiments set forth herein; rather, these embodiments are provided so that this disclosure will satisfy applicable legal requirements. As used in the specification, and in the appended claims, the singular forms "a", "an", "the", include plural referents unless the context clearly dictates otherwise.

Figure 1:
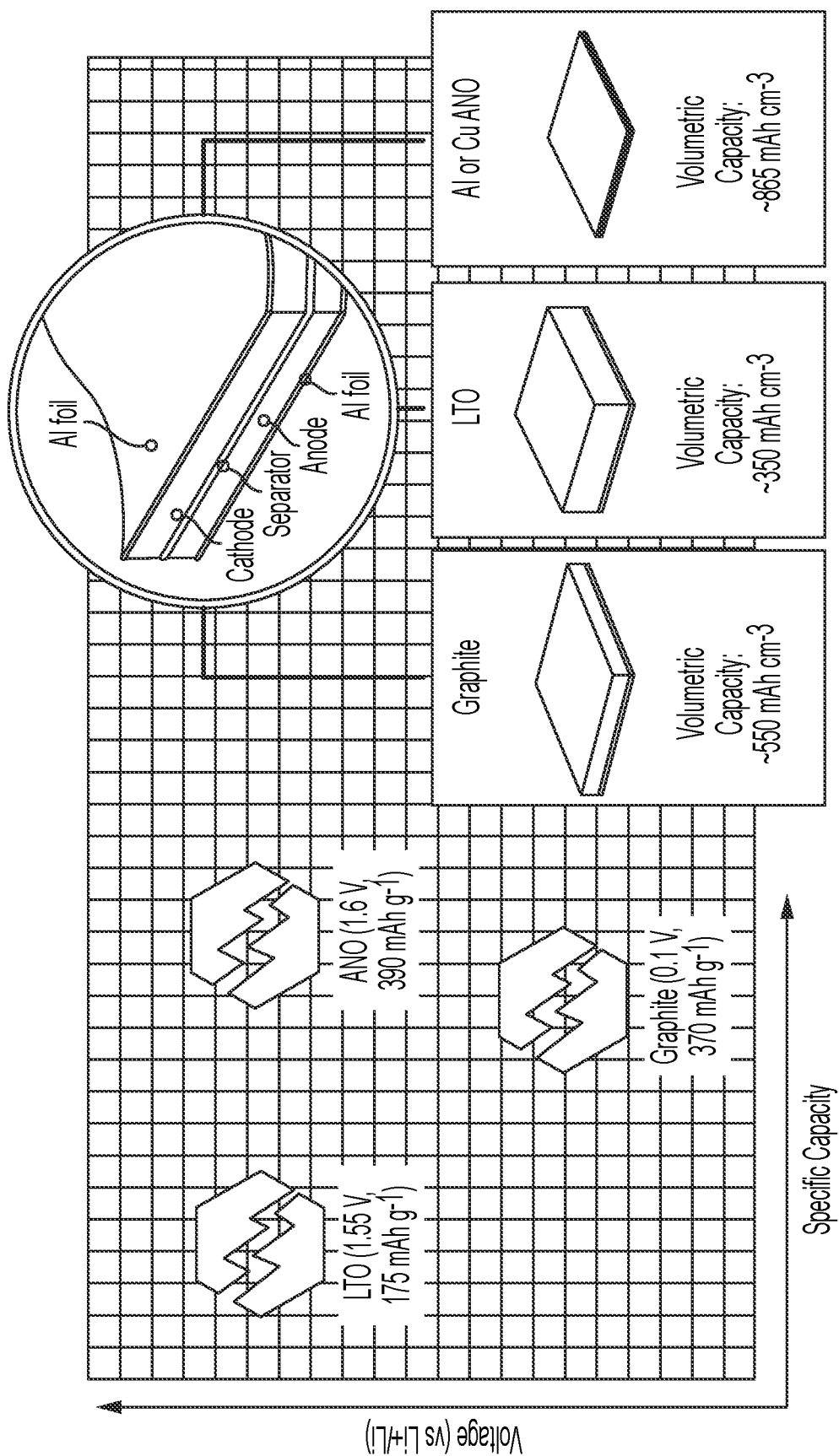
FIG. 1 illustrates an aluminum niobate (ANO) specific capacity and voltage (vs. Li+/Li) relative to LTO and graphite.

Embodiments of the present invention relate generally to utilizing the potential of niobium-based materials (e.g., niobates) in electrodes (e.g., anodes). In accordance with certain embodiments of the invention, the niobates may comprise one or more salts containing (i) an anionic grouping of niobium and oxygen and (ii) a transition metal (e.g., titanium, copper, tungsten, etc.) and/or post-transition metal (e.g., aluminum). An example niobate, for instance, may be an aluminum niobate, which may be considered as a compound of niobium, aluminum, and oxygen. In this regard, the potential for use of niobates in anodes of electrochemical cells is illustrated in FIG. 1, which illustrates an aluminum niobate (ANO) specific capacity and voltage (vs. Li$^+$/Li) relative to LTO and graphite. For instance, FIG. 1 illustrates the anode properties of these three materials, with a particular focus on volumetric capacity. Based on the theoretical capacities, skeletal densities from crystallographic information, and assuming electrode formulations (composition, capacity loading, and porosity) close to what would be encountered in commercial cells (details are shown in Table 1), it can be seen that ANO exhibits substantially higher volumetric capacity compared to both graphite and LTO. Accordingly, the present invention provides processes for the production of transition-metal-niobates (TMN) and/or post-transition-metal-niobates (PTMN), which herein after may be referred to collectively as simply "niobate" or "niobates". That is, the terms "niobate" and "niobates" as used herein may be inclusive of both TMNs and PTMNs. The processes for forming niobates, in accordance with certain embodiments of the invention, provide a readily scalable synthetic procedure for the raw material. Certain embodiments in accordance with the present invention, also provide formulations comprising a high active material loadings (>8 mg cm$^{-2}$) and compositions ($\geq$ 85 wt. %) for anodes.

chemical cell) up to 5 C. In this regard, charge and discharge rates of an electrochemical cell are governed by C-rates. The capacity of an electrochemical cell is commonly rated at 1 C, meaning that a fully charged battery rated at 1 Ah should provide 1A for one hour. The same electrochemical cell discharging at 0.5 C should provide 500 mA for two hours, and at 2 C it delivers 2A for 30 minutes. In accordance with certain embodiments of the invention and as discussed in greater detail below, when cycled at 0.5 C, ANO retained 80% capacity for >450 cycles and about 65% for >1,000 cycles. High capacity (>2 mAh cm$^{-2}$) ANO anodes may be paired with commercial cathodes (LiCoO$_2$ and LiNi$_{0.8}$Co$_{0.15}$Al$_{0.05}$O$_2$) and high-voltage LiNi$_{0.5}$Mn$_{0.5}$O$_4$ in full cells with 0.9 capacity ratios between the negative and positive electrodes (i.e., N/P ratios) and cycled at various C-rates, which demonstrates performance scales well from the electrode to the electrochemical cell level.

Figure 2A:
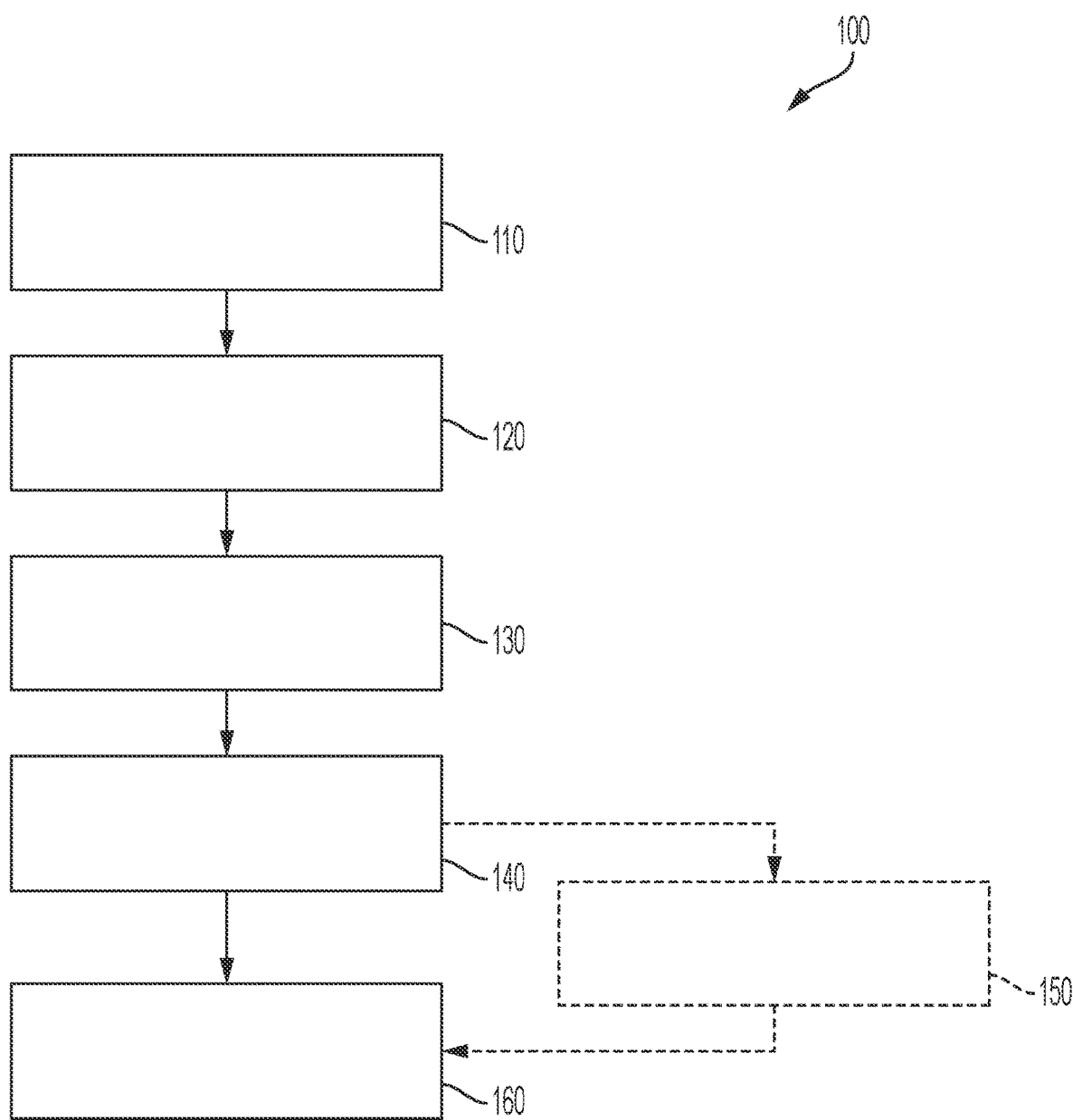
FIG. 2A illustrates a flow diagram for a process in accordance with certain embodiments of the invention.
Figure 2B:
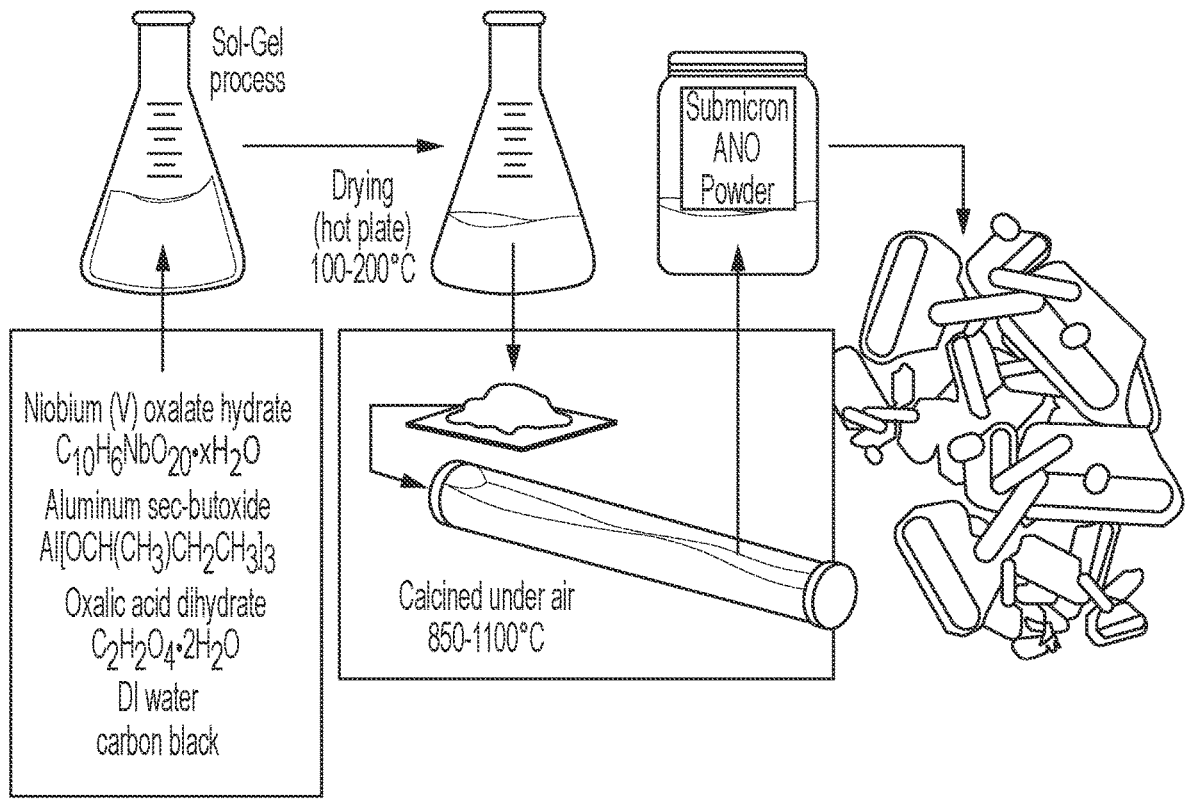
FIG. 2B illustrates a graphically-illustrated flow diagram for a process in accordance with certain embodiments of the invention
Figure 3:
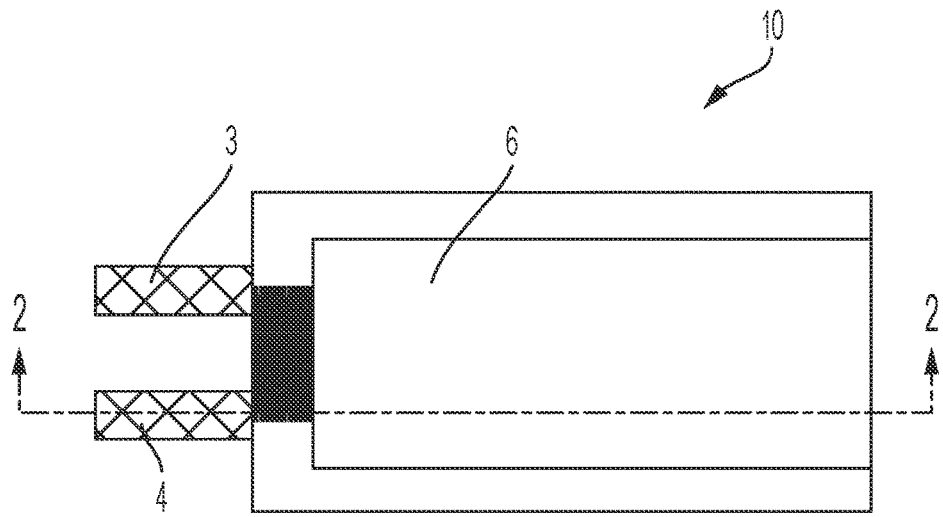
FIG. 3 illustrates an electrochemical cell according to certain embodiments of the invention.
Figure 4:
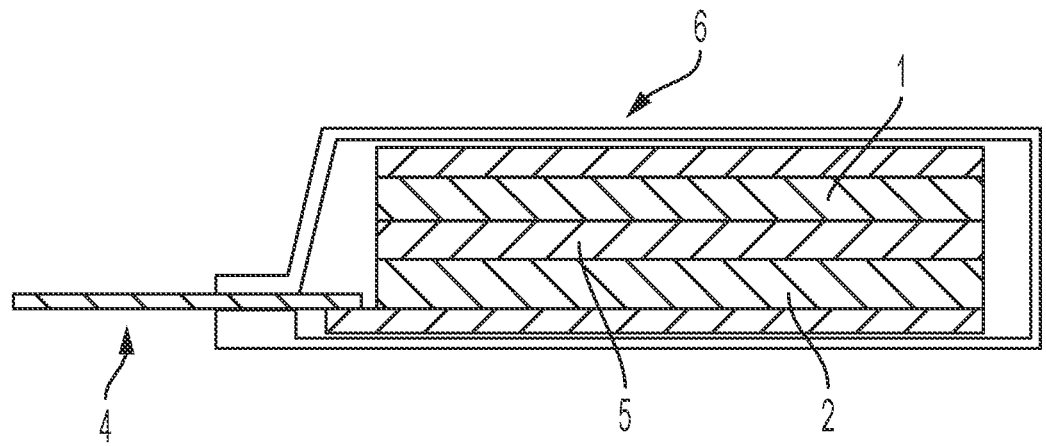
FIG. 4 illustrates a cross-sectional view of the electrochemical cell of FIG. 3.

In one aspect, the present invention provides a process for preparing a niobate material, in which the process includes the following steps as illustrated by FIGS. 2A and 2B. FIG. 2A is a flow diagram for a process in accordance with certain embodiments of the invention, while FIG. 2B illustrates a graphically-illustrated flow diagram for a process in accordance with certain embodiments of the invention. As illustrated by both FIGS. 2A and 2B, the process for preparing a niobate material 100 may comprise: (i) providing a niobium-containing source at operation 110; (ii) providing a transitional metal source (TMS), a post-transitional metal

TABLE 1

Theoretical numerical values used to calculate the volumetric capacities shown in FIG. 1. Porosity is assumed to be 30% for all electrodes with an areal capacity of 2.0 mAh/cm$^2$.

| Anode Material | Active Material (wt %) | C65 (wt %) | PVDF (wt %) | Theo. Cap. (mAh g − 1)$^a$ | Avg. Density (g cm$^3$)$^b$ | Areal Mass loading (mg cm$^{-2}$) | Thickness (μm)$^c$ | Vol. Cap. (mAh cm$^{-3}$)$^d$ |
|---|---|---|---|---|---|---|---|---|
| Graphite | 95 | 0 | 5 | 372 | 2.23 | 5.66 | 36.26 | 551 |
| LTO | 90 | 5 | 5 | 175 | 3.19 | 12.70 | 56.78 | 352 |
| ANO | 90 | 5 | 5 | 390 | 3.52 | 5.70 | 23.12 | 865 |

$^a$Theoretical capacity based on the active material.
$^b$Average density is calculated from the C65, PVDF, and skeletal density derived from corresponding Crystallographic Information File (CIF).
$^c$Thickness calculated without a current collector.
$^d$Volumetric capacity calculated without a current collector.

As noted above, niobates are promising alternatives to commercial anodes, such as graphite and LTO, as niobates provide high capacity, safe voltage, and fast charging. In accordance with certain embodiments of the invention, the present invention provides processes for producing niobates suitable for inclusion in anodes, viable anodes, and electrochemical cells including an anode comprising one or more niobates. Although the particular niobate formed by processes disclosed and described herein are not particularly limited (as noted above), one example niobate of interest is an aluminum niobate compound (AlNb$_{11}$O$_{29}$, ANO) for lithium storage (e.g., the use of this and/or similar compounds in the formation of an anode). In accordance with certain embodiments of the invention, sub-micron ANO powder with or without surface modifications may be synthesized in large quantities using a scalable sol-gel process and formulated into electrodes (e.g., anodes) with practical active material loadings (e.g., around 89%). Compared with commercial-grade LTO, ANO in accordance with certain embodiments of the invention may deliver higher capacity at all C-rates (e.g., charge and discharge rates of the electrosource (PTMS), or both at operation 120; (iii) dissolving (a) the niobium-containing source, and (b) the TMS, the PTMS, or both in an aqueous medium to form an intermediate solution at operation 130; (iv) forming an intermediate paste by admixing an inert support material with the intermediate solution at operation 140; (v) optionally coating the intermediate paste on a support substrate at operation 150; and (vi) removing the inert support material by subjecting the intermediate paste to a calcination process and providing a transition-metal-niobate (TMN) and/or a post-transition-metal-niobate (PTMN) at operation 160.

In accordance with certain embodiments of the invention, the niobium-containing source may be soluble in water, for example, freely soluble in water. By way of example, the niobium-containing source may have a solubility in water 25° C. from at least about any of the following: 5, 10, 15, 20, 25, 30, 35, 40, 50, 60, 70, 80, 90, 100, and 110 g/L and/or at most about 250, 225, 200, 190, 180, 170, 160, 150, 140, 130, 120, and 110 g/L. In accordance with certain embodiments of the invention the niobium-containing source may be freely miscible with water in all proportions. The niobium-containing source, for example, may comprise a water-soluble niobium salt containing inorganic or organic cations, such as niobium oxalate (e.g., a niobium (V) oxalate hydrate.

In accordance with certain embodiments of the invention, the TMS, which may be water soluble, may comprise one or more of titanium, copper, and tungsten. Additionally or alternatively, the addition of metallic elements (e.g., metallic dopants) can enhance the electrical and ionic conductivity. Example metallic elements (e.g., metallic dopants) may include both transition and non-transition metals, such as titanium (Ti), copper (Cu), tungsten (W), ruthenium (Ru), iron (Fe), tin (Sn), molybdenum (Mo), and vanadium (V). Additionally or alternatively, the PTMS comprises may comprise aluminum. Additionally or alternatively, the addition of metallic elements (e.g., metallic dopants) can enhance the electrical and ionic conductivity. Example metallic elements (e.g., metallic dopants) may include both transition and non-transition metals, such as titanium (Ti), copper (Cu), tungsten (W), ruthenium (Ru), iron (Fe), tin (Sn), molybdenum (Mo), and vanadium (V). In accordance with certain embodiments of the invention, the TMS and/or the PTMS may comprises the transitional metal and/or the post-transitional metal in free from or in the form a metal-organic salt (e.g., aluminum sec-butoxide as shown in FIG. 2). In accordance with certain embodiments of the invention, the TMS and/or the PTMS may have a solubility in water 25° C. from at least about any of the following: 0.5, 1, 3, 5, 8, 10, 15, 20, 25, 30, 35, 40, 50, 60, 70, 80, 90, 100, and 110 g/L and/or at most about 250, 225, 200, 190, 180, 170, 160, 150, 140, 130, 120, and 110 g/L. In accordance with certain embodiments of the invention the niobium-containing source may be freely miscible with water in all proportions. In this regard, the TMS and/or the PTMS as well as the niobium-containing source may each be water soluble to facilitate the formation of the intermediate solution (e.g., solution, or colloidal solution).

In accordance with certain embodiments of the invention, the process may comprise adding an organic acid during the step of forming the intermediate solution. For example, the organic acid may comprise a carboxylic acid or a di-carboxylic acid. In accordance with certain embodiments of the invention, the organic acid may comprises oxalic acid. Additionally or alternatively, the organic acid may comprise lactic acid, acetic acid, formic acid, citric acid, uric acid, malic acid, tartaric acid, oxalic acid, or any combination thereof. The addition of the organic acid, for instance, may facilitate the dissolution of the niobium-containing source. In accordance with certain embodiments of the invention, the organic acid (e.g., oxalic acid) may be provided and maintained in excess in the intermediate solution to facilitate dissolution of the niobium-containing source. For example, the organic acid may be provided in excess in the intermediate solution in that range up to 10 wt. % of the intermediate solution (e.g., from at least about any of the following: 1, 3, and 5 wt. % of the intermediate solution, and/or at most about any of the following: 10, 8, 6, and 5 wt. % of the intermediate solution) to facilitate dissolution of the niobium-containing source.

In accordance with certain embodiments of the invention, the niobium-containing source may comprise a free-niobium amount (atomic % of niobium) and the TMS may comprise a free-transition metal amount (atomic % of the transition metal), in which the intermediate solution comprises a first ratio between the free-niobium amount (atomic % of niobium) and the free-transition metal amount (atomic % of the transition metal) of about 1:20 to about 1:1, such as at least about any of the following: 1:20, 1:15, 1:10, 1:9, 1:8, 1:6, 1:5, and 1:4, and/or at most about any of the following: 1:1, 1:1.5, 1:2, 1:2.5, 1:3, 1:3.5, and 1:4. In accordance with certain embodiments of the invention, the intermediate solution comprises an excess of an organic acid (e.g., oxalic acid).

In accordance with certain embodiments of the invention, the niobium-containing source may comprise a free-niobium amount (atomic % of niobium) and the PTMS may comprise a free-post-transition metal amount (atomic % of the post-transition metal), wherein the intermediate solution comprises a first ratio between the free-niobium amount (atomic % of niobium) and the free-post-transition metal amount (atomic % of the post-transitional metal) of about 1:20 to about 1:1, such as at least about any of the following: 1:20, 1:15, 1:10, 1:9, 1:8, 1:6, 1:5, and 1:4, and/or at most about any of the following: 1:1, 1:1.5, 1:2, 1:2.5, 1:3, 1:3.5, and 1:4. In accordance with certain embodiments of the invention, the intermediate solution comprises an excess of an organic acid (e.g., oxalic acid).

In accordance with certain embodiments of the invention, the inert support material comprises a material that does not react with (i) the niobium-containing source or (ii) the TMS and/or PTMS. The inert support material, for example, may comprise a plurality of particles. The plurality of particles, in accordance with certain embodiments of the invention, may have an average diameter from about 5 nm to about 200 nm, such as at least about any of the following: 5, 8, 10, 20, 30, 40, 50, 60, 70, 80, 90, and 100 nm, and/or at most about any of the following: 200, 180, 160, 140, 120, and 100 nm. The inert support material, for example, may comprise carbon black, carbon-nano-tubes, graphene, carbon nanofibers, or any combinations thereof. In accordance with certain embodiments of the invention, the inert support material may comprise any carbon and/or hydrocarbon sacrificial material.

The intermediate paste, in accordance with certain embodiments of the invention, may comprise from about 5 wt. % to about 95 wt. % on a dry basis (e.g., water and/or other solvents are disregarded in the weight percentage) of the inert support material, such as at least about any of the following: 5, 10, 15, 20, 25, 30, 35, and 40 wt. % on a dry basis of the inert support material, and/or at most about any of the following: 95, 90, 85, 80, 75, 70, 65, 60, 55, 50, 45, and 40 wt. % on a dry basis of the inert support material. Additionally or alternatively, the intermediate paste may comprises a diphasic system containing both a liquid phase comprising the intermediate solution and a solid phase comprising the inert support material.

In accordance with certain embodiments of the invention, the intermediate paste may optionally be coated on a support substrate forming a film layer of the intermediate paste on the support substrate. In this regard, the formation of a film layer of the intermediate paste on a support substrate may facilitate subsequent drying and/or calcination of the intermediate paste. For example, subsequent drying and/or calcination operations may be shortened in duration and/or provide a more uniform drying and/or calcination to mitigate the presence of localized regions in the paste that may not be sufficiently dried and/or calcinated. By way of example only, the film layer of the intermediate paste may have a low apparent density that forms a highly porous spongy structure (e.g., includes a plurality of pores throughout the intermediate paste).

In accordance with certain embodiments of the invention, the process may comprise a step of drying the intermediate paste to form a dry-intermediate paste. The dry-intermediate paste, for example, may comprise from about 0 to about 5 wt. % of water, such as at least about any of the following: 0, 0.5, 1, 1.5, 2, and 2.5 wt. % of water, and/or at most about any of the following: 5, 4.5, 4, 3.5, 3, and 2.5 wt. % of water. In accordance with certain embodiments of the invention, the step of drying the intermediate paste may comprise subjecting the intermediate paste to an elevated temperature for a predetermined amount of time. The elevated temperature, for example, may comprise from about 100° C. to about 400° C., such as at least about any of the following: 100, 125, 150, 175, and 200° C., and/or at most about any of the following: 400, 375, 350, 325, 300, 275, 250, 225, and 200° C. Additionally or alternatively, the predetermined amount of time May comprise from about 6 hours to about 48 hours, such as at least about any of the following: 6, 8, 10, 12, 15, 18, 20, 22, and 24 hours, and/or at most about any of the following: 48, 45, 42, 40, 38, 35, 32, 30, 28, and 24 hours.

In accordance with certain embodiments of the invention, the calcination process may comprise subjecting the intermediate paste to a calcination temperature from about 800° C. to about 1400° C., such as at least about any of the following: 800, 850, 900, 950, 1000, 1050, and 1100° C., and/or at most about any of the following: 1400, 1350, 1300, 1250, 1200, 1150, and 1100° C. Additionally or alternatively, the calcination process may comprise subjecting the intermediate paste to the calcination temperature from about 4 hours to about 12 hours, such as at least about any of the following: 4, 5, 6, 7, and 8 hours, and/or at most about any of the following: 12, 11, 10, 9, and 8 hours. In accordance with certain embodiments of the invention, for example, the calcination process may comprise subjecting the dry-intermediate paste to a calcination temperature from about 800° C. to about 1400° C., such as at least about any of the following: 800, 850, 900, 950, 1000, 1050, and 1100° C., and/or at most about any of the following: 1400, 1350, 1300, 1250, 1200, 1150, and 1100° C. Additionally or alternatively, the calcination process may comprise subjecting the dry-intermediate paste to the calcination temperature from about 4 hours to about 12 hours, such as at least about any of the following: 4, 5, 6, 7, and 8 hours, and/or at most about any of the following: 12, 11, 10, 9, and 8 hours.

In accordance with certain embodiments of the invention, the process forms one or more TMNs, such as a titanium niobate, a copper niobate, a ruthenium niobate, an iron niobate, a molybdenum niobate, a vanadium niobate, or a tungsten niobate. Additionally or alternatively, the process may form one or more PTMNs, such as an aluminum niobate, a tin niobate. and vanadium (V).

In accordance with certain embodiments of the invention, the TMN, the PTMN, or both may comprise a plurality of particulates having an average diameter from about 0.1 microns to about 100 microns, such as at least about any of the following: 1, 3, 5, 8, 10, 12, 15, 18, and 20 microns, and/or at most about any of the following: 100, 90, 80, 70, 60, 50, 40, 30, and 20 microns. In this regard, for non-round particulates, the numerical value for the diameter of each particulate will be the largest length across an individual particulate.

In accordance with certain embodiments of the invention, the TMN and/or the PTMN may have a surface area as a bulk material from about 0.5 meters-squared per gram of the bulk material ($m^2/g$) to about 6 $m^2/g$, such as at least about any of the following: 0.5, 0.8, 1, 1.2, 1.5, 1.8, 2, 2.2, and 2.5 $m^2/g$, and/or at most about any of the following: 6, 5.8, 5.5, 5.2, 5, 4.8, 4.5, 4.2, 4, 3.8, 3.5, 3.2, 3, 2.8, and 2.5 $m^2/g$; in which, the surface area may be determined by performing a nitrogen gas sorption isotherm on a Quantachrome NOVA 2200e surface area and porosity analyzer at 77 K. In this regard, the TMN and/or PTMN (e.g., ANO) may be thermally activated overnight at 200° C. under 0.01 mmHg of dynamic vacuum. Helium gas may be used to measure the dead space volume prior to measurements. Brunauer-Emmett-Teller (BET) surface area is then determined by linear least-square fitting of the BET plot, the upper working limit being provided by the Rouquerol analysis.

In accordance with certain embodiments of the invention, the TMN, the PTMN, or both may comprise the plurality of particulates, in which the plurality of particulates may comprise a one or more shapes. For example, various parameters related to the crystallization (e.g., concentration, metals being employed, agitation rate, etc.) of the TMN and/or the PTMN can be adjusted resulting in formation of rod and/or platelet-like crystals. In this regard, the TMN and/or the PTMN may, in accordance with certain embodiments of the invention, have an average aspect ratio from about 2:1 to about 20:1.

In accordance with certain embodiments of the invention, the TMN, the PTMN, or both may comprise the plurality of particulates having an average diameter (as noted above) and/or an average aspect ratio (as noted above), in which the average diameter and/or the average aspect ratio may be controlled, at least in part, by controlling the average diameter of the inert support material, the amount of the inert support material relative to an amount of the intermediate solution, or both.

In another aspect, the present invention provides an anode including an anode-composition comprising an active anode species. As used herein, the term "active anode species" may comprise any electrochemically active species associated with the anode. The active anode species, for example, may comprise at least one niobate compound comprising at least one TMN, at least one PTMN, or both. In accordance with certain embodiments of the invention, the anode composition may comprise from about 80 wt. % to about 95 wt. % of the at least one niobate compound, such as at least about any of the following: 80, 81, 82, 83, 84, and 85 wt. % of the niobate compound, and/or at most about any of the following: 90, 89, 88, 87, 86, and 85 wt. % of the niobate compound. In accordance with certain embodiments of the invention, the niobate compound may comprise a titanium niobate, a copper niobate, a tungsten niobate, an aluminum niobate, or any combination thereof.

In accordance with certain embodiments of the invention, anode-composition also comprises one or more binders. The one or more binders, for example, may comprise polyvinylidene fluoride, polyvinylidene difluoride (PVDF), a styrene-butadiene rubber (SBR), carboxymethyl cellulose (CMC), or any combination thereof. In accordance with certain embodiments of the invention the anode-composition may comprise from about 3 to about 12 wt. % of the one or more binders, such as from at least about any of the following: 3, 4, 5, and 6 wt. % of the one or more binders, and/or at most about any of the following: 12, 11, 10, 9, 8, 7, and 6 wt. % of the one or more binders.

In accordance with certain embodiments of the invention, at least one niobate compound and the one or more binders may by homogenously admixed and coated onto a support. Additionally or alternatively, the anode-composition may comprise a conductive dopant that may be dispersed (e.g., homogeneously) throughout the anode-composition and/or layered on a surface of the anode-composition of the anode, such as the surface that is or will be in contact or proximate to an electrolyte of an electrochemical cell. Non-limiting examples of suitable conductive dopants include graphite, carbon black, carbon-nano-tubes, graphene, graphitic carbon fibers (e.g., microfibers and/or nanofibers).

In yet another aspect, the present invention provides an electrochemical cell including (i) an anode, (ii) a cathode, and (iii) an electrolyte positioned between and in contact with the anode and the cathode. The anode includes an anode-composition, such as any disclosed herein, comprising an active anode species comprising at least one niobate compound comprising at least one transition-metal-niobate (TMN), at least one post-transition-metal-niobate (PTMN), or both. The anode composition may comprises from about 80 wt. % to about 95 wt. % of the at least one niobate compound, such as at least about any of the following: 80, 81, 82, 83, 84, and 85 wt. % of the niobate compound, and/or at most about any of the following: 90, 89, 88, 87, 86, and 85 wt. % of the niobate compound. In accordance with certain embodiments of the invention, the niobate compound may comprise a titanium niobate, a copper niobate, a tungsten niobate, an aluminum niobate, or any combination thereof.

In accordance with certain embodiments of the invention, the electrolyte may comprise (i) a liquid electrolyte composition comprising an organic or aqueous solvent and one or more electrolytes (e.g., one or more salts), or (ii) a gel polymer electrolyte (GPE) comprising a GPE-composition comprising a polymeric network and an electrolyte composition absorbed by the GPE, wherein the electrolyte composition comprises an organic or aqueous solvent and one or more electrolytes (e.g., one or more salts).

The electrolyte, whether disposed within a liquid electrolyte or within a GPE, may comprise one or more lithium salts, magnesium salts, zinc salts, calcium salts, or any combination thereof. For example, the one or more electrolytes may include a compound capable of generating an ion on being dissolved in a solvent including lithium salts such as lithium hexafluorophosphate ($LiPF_6$), lithium tetrafluoroborate ($LiBF_4$), lithium hexafluoroarsenate ($LiAsF_6$), lithium perchlorate ($LiClO_4$), lithium trifluoromethanesulfonate ($CF_3SO_3Li$), lithium bis(trifluoromethanesulfonyl)imide ($LiN(SO_2CF_3)_2$), lithium bis(perfluoroethanesulfonyl)imide ($LiN(SO_2C_2F_5)_2$), tris(trifluoromethanesulfonyl)methyllithium ($LiC(SO_2CF_3)_3$), tris(perfluoroethanesulfonyl)methyllithium ($LiC(SO_2C_2F_5)_3$), lithium tetrachloroaluminate ($LiAlCl_4$), lithium hexafluorosilicate ($Li_2SiF_6$), and lithium dicyanamide ($LiC_2N_3$). Additionally or alternatively to lithium salts, the electrolyte(s) may be selected from sodium salts, magnesium salts, zinc salts, and calcium salts. In accordance with certain embodiments of the invention, the one or more electrolytes may comprise lithium bis(trifluoromethanesulfonyl)imide (LiTFSI), lithium trifluoromethanesulfonate (LiOTf), lithium chloride (LiCl), lithium perchlorate ($LiClO_4$), lithium bromide (LiBr), lithium iodide (LiI), lithium thiocyanate (LiSCN), lithium tetrafluoroborate ($LiBF_4$), lithium hexafluoroarsenate ($LiAsF_6$), lithium bis(oxalate) borate, lithium hexafluorophosphate ($LiPF_6$), a lithium polysulfide, zinc trifluoromethanesulfonate ($Zn(OTf)_2$), di[bis(trifluoromethanesulfonyl)imide] ($Zn(TFSI)_2$), or combinations thereof.

In accordance with certain embodiments of the invention, the one or more electrolytes may comprise from about 0 wt. % to about 10 wt. % of an organic solvent, such as at least about any of the following: 0, 1, 2, 3, 4, and 5 wt. %, and/or at most about any of the following: 10, 9, 8, 7, 6, and 5 wt. %. The electrolyte, in accordance with certain embodiments of the invention, may be devoid of an organic solvent.

FIG. 1 illustrates an exterior of an electrochemical cell 10 according to certain embodiments of the invention. As shown in FIG. 1, the electrochemical cell 10 may comprise a battery container or housing 6, a cathode lead terminal 3 and an anode lead terminal 4. FIG. 2 illustrates a cross-sectional view of the electrochemical cell 10 of FIG. 1. As shown in FIG. 2, the electrochemical cell comprises a cathode 1, an anode 2, and an electrolyte 5 that is disposed between and in contact with the cathode 1 and anode 2.

EXAMPLES

The present disclosure is further illustrated by the following examples, which in no way should be construed as being limiting. That is, the specific features described in the following examples are merely illustrative and not limiting.

The following examples outlines a comprehensive study on ANO anodes with detailed analysis at the material, electrode, and electrochemical cell level. In this regard, ANO with platelet-like morphology was synthesized in a two-step scalable synthetic method, such as those described and disclosed herein. This simple process is more environmentally friendly and capable of producing powder in large quantities without toxic by-products. The as-synthesized powder was then investigated as a potential high-performance battery anode material at high active material loading, such as up to 93 wt. % and 2.17 mAh cm-2. The effects of binder and voltage limits on capacity, rate performance, and cycle life were explored to facilitate the electrode formulation for subsequent electrochemical cell studies. As will be shown in detail below, the ANO exhibited excellent electrochemical performance in both half-cells and full-cells against commercial cathodes (LCO and NCA) and high-voltage spinel with negative (N) to positive (P) capacity ratios similar to what would be encountered in commercial cells (N/P ratios of 0.9). To highlight the performance benefits of ANO, its rate capability was compared to that of commercial-grade LTO, where it was found that ANO exhibits higher capacity at all C-rates. Finally, and for the first time to our knowledge for niobate anodes, high-level cell safety studies for ANO were performed, in direct comparison with similar cells containing graphite and LTO. Specifically, multi-layer pouch cells at 2.5 Wh were built and subjected to (a) nail penetration at the cell level and (b) disassembling the cells and exposing the charged anodes to ambient air. Cell temperature and electrode reactivity, respectively, were monitored using a thermal camera. Interestingly, the examples show that while LTO and ANO are much more reactive with air than graphite when lithiated, their fully charged full cells are more stable than graphite cells. Overall, the results illustrated herein provide new insights into the synthesis, formulation, cell performance, and safety for niobate anodes and highlight the tremendous potential of these materials for practical high energy, fast-charging, long cycle life Li-ion batteries.

Materials

Niobium (V) oxalate hydrate ($C_{10}H_5NbO_{20} \cdot xH_2O$), aluminum sec-butoxide ($Al[OCH(CH_3)CH_2CH_3]_3$, 95%), oxalic acid dihydrate ($C_2H_2O_4 \cdot 2H_2O$, 98%), and carbon black (acetylene, 50% compressed, 99.9%) were purchased from Alfa Aesar. Carboxymethyl cellulose (CMC), styrene-butadiene rubber (SBR), SUPER $C_{65}$ carbon black, lithium nickel manganese oxide (LNMO), and CR2032 components were purchased from MTI corporation. Polyvinylidene fluoride or polyvinylidene difluoride (PVDF) was purchased from Soulbrain (MI, USA). 1 M lithium hexafluorophosphate ($LiPF_6$) in a mixture of ethylene carbonate (EC) and dimethyl carbonate (DMC) with a volume ratio of 3:7 was purchased from Soulbrain. Lithium titanate oxide (LTO), lithium cobalt oxide (LCO), and lithium nickel cobalt aluminum oxide (NCA) were graciously provided by Saft America. All reagents were used as received with no further purification unless specified otherwise.

Preparation of $AlNb_{11}O_{29}$

The weight fraction of Nb (in the form of $Nb_2O_5$) in $C_{10}H_5NbO_{20} \cdot xH_2O$ was calibrated by calcining at 1100° C. in air for 8 h with a resulting yield of $Nb_2O_5$ at 27.10 wt %. In a typical procedure for the synthesis of $AlNb_{11}O_{29}$ (120.0 g, 79.3 mmol), $Al[OCH(CH_3)CH_2CH_3]_3$ (20.56 g, 82.4 mmol) and distilled water (18 MΩ cm, 1 L) were first mixed in a 2 L Pyrex glass beaker followed by the addition of $C_{10}H_5NbO_{20} \cdot xH_2O$ (427.88 g, 664.4 mmol) and $C_2H_2O_4 \cdot 2H_2O$ (100 g, 793.2 mmol). The beaker was placed on a hotplate at 70° C. with stirring to accelerate the dissolution of the chemicals, producing a clear solution within minutes. The clear liquid was mixed with carbon black (200 g) inside a large metal pot, making a thick black paste. The paste was dried at 100° C. for 12 h followed by further drying at 200° C. for 24 h. The dried paste was calcined at 850° C. in air until all the carbon black was burned out, and a fluffy off-white powder was obtained. Finally, the powder was calcined at 1100° C. for 8 h in air.

Material Characterization

Powder X-ray diffraction (PXRD) was performed under ambient conditions on a PANalytical Empyrean Series 2 diffractometer in a Bragg-Brentano geometry using a Ni-filtered lined-focused CuKα radiation (λ=1.5406 Å). Data was collected from 15-70 2θ-degrees and subsequent Rietveld refinement was performed by the general structure analysis system (GSAS) program of the as collected X-ray diffraction pattern. Morphological characterization was performed using a Thermo Scientific™ Scios™ DualBeam™ scanning electron microscope (SEM) operated at an accelerating voltage of 5 kV.

Electrochemical Characterization

All cells were constructed in an argon-filled glove box with humidity and oxygen maintained at <0.5 ppm. ANO electrodes were prepared by mixing the active material, with SUPER C65 carbon black, and a mixture of binder, either CMC+SBR in DI H2O (18 MΩ cm) or PVDF in NMP to form a slurry in the appropriate weight ratio. The slurry was then mixed in a THINKY AR-100 planetary mixer from 10-30 min followed by blade coating on Al foil and drying in air for 2 h. Subsequently, the air-dried electrode was placed in a vacuum oven at 120° C. for 12 h and then calendered with an 8" width heated rolling press (MTI). The areal capacity loadings for ANO were 0.6-0.75 mAh $cm^{-2}$ for half-cells (CV, rate capability, and cycling stability) and 2.17 mAh $cm^{-2}$ for full-cell testing. The electrochemical performance of half cells was studied in CR2032-type coin cells with C-Type glass fiber (GF/C) separator membranes. Lithium metal was used as the counter/reference electrode and the electrolyte was 1M $LiPF_6$ in EC:DMC (volume ratio 3:7). Cyclic voltammetry (CV) measurements were performed using a Gamry Reference 3000 workstation at a scan rate of 0.1 mV $s^{-1}$ with cut-off voltages from 0.5-3.0 V. The galvanostatic charge-discharge cycling was evaluated between 1.0-3.0 V and a current rate fixed at 250 mA $g^{-1}$ for $AlNb_{11}O_{29}$ on a Landt Instruments CT2001A battery test station. Rate capability was performed in 5 cycle increments at rates of 0.1 C, 0.5 C, 1 C, 2 C, 5 C and 0.1 C using constant current/constant voltage charge and constant current discharge profiles in 2032 coin cells. Cathode electrodes used in this study (LCO, NCA, and LNMO) were prepared by uniformly mixing the active powder with SUPER C65 carbon black, and PVDF at a mass ratio of 90:5:5 in N-methyl-2-pyrrolidone (NMP) to prepare the electrode slurry. Slurries were then blade coated onto Al foil and dried in a vacuum oven at 120° C. ANO||LCO, ANO||NCA, and ANO||LNMO full-cells were assembled with areal capacities of 2.17 and 2.4 mAh $cm^{-2}$ for the ANO and the paired cathode, respectively (NP ratio of ~0.9). All full cells used 1 M $LiPF_6$ in a mixture of EC:DMC with a volume ratio of 3:7 as the electrolyte and GF/C as the separator Ambient Anode Evaluation and Nail Penetration Test All electrodes and full cells were conditioned in pouch cells by two full charge-discharge cycles at 0.1 C followed by a final charge at 0.1 C with a constant voltage step that was current limited to 0.02 C. Cells used LCO as the cathode and were built with an active electrode area of 2×3 inches and charged from 0.5-3.0, 1.0-2.9, and 2.7-4.2 for ANO||LCO, LTO||LCO, and graphite||LCO, respectively. Double-sided electrodes were coated with N/P ratios of 1.1 for graphite cells and 0.9 for ANO and LTO cells with 1 M $LiPF_6$ in a mixture of EC:DMC (volume ratio of 3:7) as the electrolyte. The electrode level testing was performed by exposing charged anodes to ambient conditions within a fume hood in quadruplicates, monitoring temperature with a thermal camera and four external thermocouples at different locations. The highest temperature that was observed was reported. For nail penetration experiments, a single nail was driven through the center of the full cell into a wooden backing and left within the cell for the duration of the experiment. The experiment was performed twice on each electrode pair, one time each on cells with a 25 μm polypropylene and a GF/C separator.

Results and Discussion

Synthesis and Materials Characterization of $AlNb_{11}O_{29}$

Figure 5:
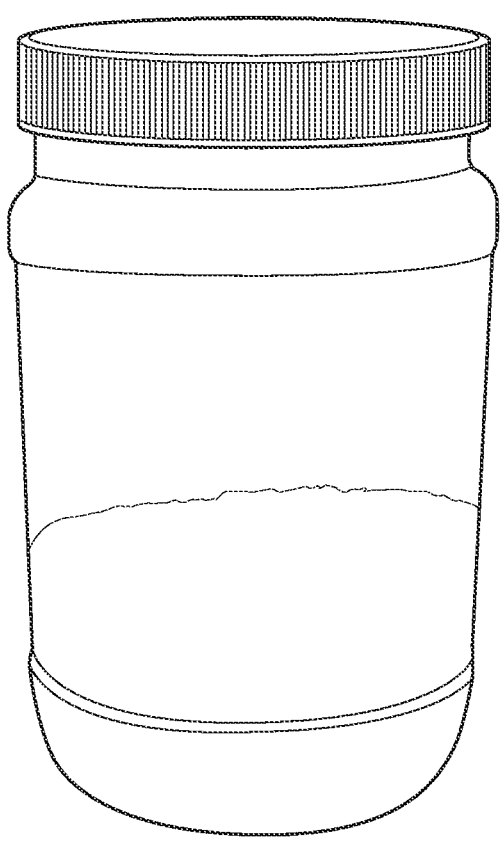
FIG. 5 illustrates a white niobate powdered material produced by a process in accordance with certain embodiments of the invention.

This study focuses on developing an oxalate-based wet chemistry approach for facile and scalable synthesis of aluminum niobate anode materials. This method can also be used for the fabrication of other niobate compounds for alkaline ion storage and battery anode applications. Traditionally, niobate anode powders are prepared by mechanical mixing of solid precursors, such as oxides and hydroxides, followed by calcination. Such methods lack the freedom for manipulating, controlling and fine-tuning powder characteristics affecting electrode fabrication and battery performance. These important factors include powder size, crystallinity and morphology, degree of agglomeration, flowability, and dispersibility. Solution chemistry routes, in accordance with certain embodiments of the invention, can not only allow the design and formulation of metal salts with complex compositions starting from the atomic level, but also provide possibilities for various processing techniques and powder morphology engineering including co-precipitation, hydrothermal, spray pyrolysis, film and coating deposition, and the use of sacrificial templates. Aqueous solution chemistry processing, in accordance with certain embodiments of the invention, is highly preferable due to low cost and no need for organic solvents. Water-soluble niobium oxalate is a readily available niobium source for aqueous solution synthesis of niobates. In these examples, freshly formed aluminum hydroxide gel and niobium oxalate are first co-dissolved in water with the aid of excess oxalic acid, followed by mixing the solution with carbon black powder to form a paste (Scheme 1b). The co-deposit is dried on the carbon support and finally calcined in air to remove the carbon black and form the ANO phase. The carbon black support allows the formation of well-dispersed powder with a low degree of agglomeration. This two-step process eliminates the production of harmful side products making the process safer and more environmentally friendly. Furthermore, there is no need for an inert atmosphere throughout the process, enabling scalable powder production. In fact, through the course of this work, the foregoing processes in accordance with certain embodiments of the invention have produced up to 140 g in a single batch of a white niobate material as shown in FIG. 5, limited only by the size of the oven in the lab.

Figure 6A:
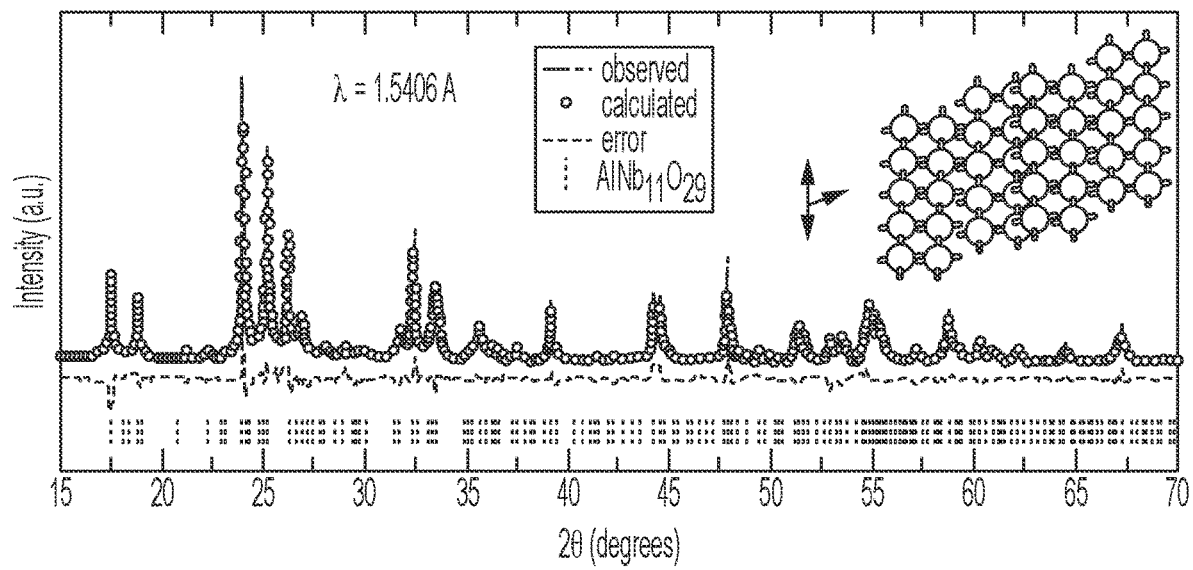
FIG. 6A illustrates a Rietveld refinement of the powder pattern of a niobate material produced by a process in accordance with certain embodiments of the invention.
Figure 6B:
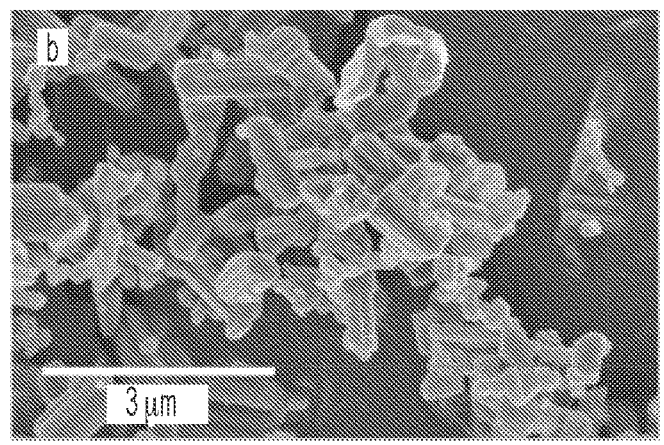
FIG. 6B illustrates a SEM image of an as-synthesized niobate powder in accordance with certain embodiments of the invention.
Figure 6C:
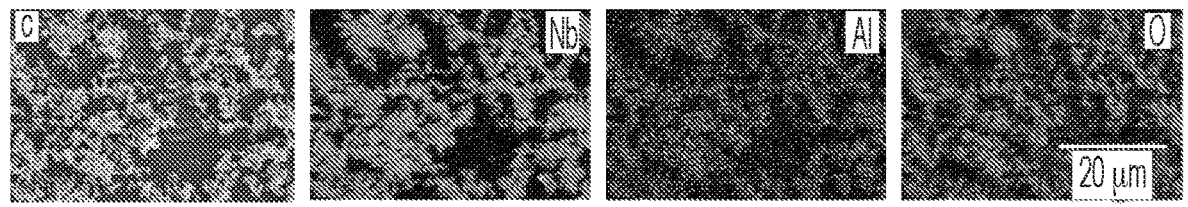
FIG. 6C shows EDX mapping images of Nb, Al, and O.

The as-synthesized ANO powder was analyzed using powder X-ray diffraction (PXRD) and verified to be high phase purity with only a small amount of m-$Nb_2O_5$ impurity (~2.8 wt %) as illustrated by FIG. 2. Rietveld refinement of the powder pattern is commensurate with previous reports of a shear $ReO_3$-type monoclinic crystal structure that belongs to the A2/m space group. The lattice parameters were refined to be 15.561248(67), 3.812895(16), and 20.232341(82) Å for a, b, c, respectively; with a V=1.104652(132) $nm^3$ and a β of 113.043(4)° as summarized in Tables 2 and 3. The $Al^{+3}$ and $Nb^{+5}$ ions exhibit a ratio of 1:11 that disorderly occupy corner- and edge-sharing octahedral sites with a 3×4×∞ connectivity as shown in FIG. 6A. This connectivity ensures high structural stability while forming regular 1D interstitial channel sites that Li+ ions can readily diffuse through. Scanning electron microscopy (SEM) revealed the as-synthesized ANO powder exhibits a submicron platelet-like morphology as shown in FIG. 6B. The energy-dispersive X-ray spectroscopy (EDX) elemental microanalysis reveals the uniform distribution of Al, Nb, and O, further indicating high purity ANO was synthesized as illustrated by FIG. 6C.

TABLE 3-continued

Fractional atomic parameters of as-synthesized ANO.

| Atom[a] | symmetry | site | x | y | z |
|---|---|---|---|---|---|
| O4 | m | 4i | 0.3643 | 0 | 0.2471 |
| O5 | m | 4i | 0.2204 | 0 | 0.1063 |
| O6 | m | 4i | 0.2219 | 0 | 0.9218 |
| O7 | m | 4i | 0.0381 | 0 | 0.3578 |
| O8 | m | 4i | 0.0900 | 0 | 0.7838 |
| O9 | m | 4i | 0.3638 | 0 | 0.8690 |
| O10 | m | 4i | 0.0862 | 0 | 0.6021 |
| O11 | m | 4i | 0.9623 | 0 | 0.0553 |
| O12 | m | 4i | 0.9640 | 0 | 0.6777 |
| O13 | m | 4i | 0.0741 | 0 | 0.9709 |
| O14 | m | 4i | 0.5000 | 0 | 0.1882 |
| O15 | m | 4i | 0.0658 | 0 | 0.16650 |

[a]$M = 11/12\ Nb^{5+} + 1/12\ Al^{3+}$

Electrode Performance

Figure 7A:
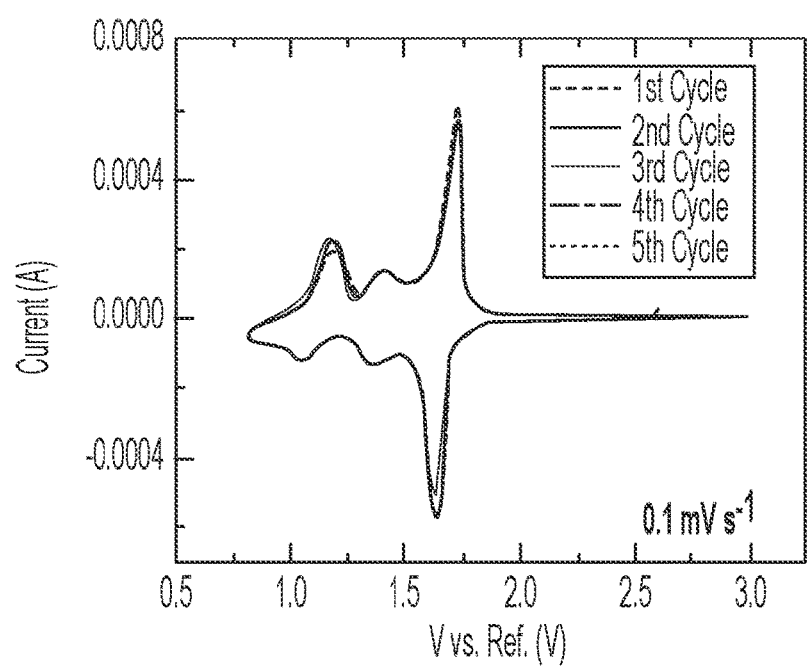
FIG. 7A illustrates CV curves of ANO at 0.1 mv s$^{-1}$ over five cycles, in which Li foil served as the counter and reference electrode in accordance with certain embodiments of the invention.
Figure 7B:
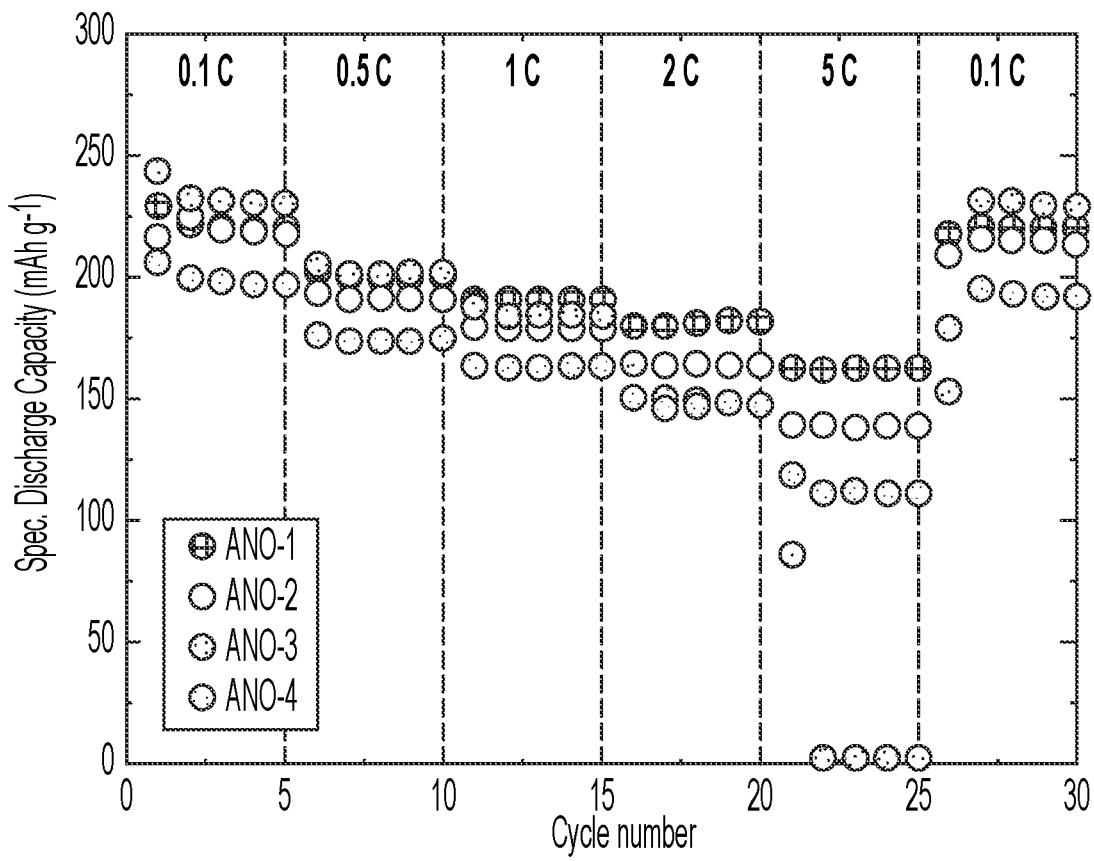
FIG. 7B illustrates galvanostatic charge-discharge of the prepared ANO electrodes cycled from 0.1-5 C in five cycle increments in accordance with certain embodiments of the invention.

The electrochemical properties of ANO were first evaluated in Li half-cells in the voltage range between 3.0-0.8 V as illustrated by FIG. 7A. In this regard, FIG. 7A illustrates CV curves of ANO at 0.1 mv $s^{-1}$ over five cycles, in which Li foil served as the counter and reference electrode. The first five cyclic voltammetry (CV) curves at 0.1 mV $s^{-1}$ present three pronounced anodic/cathodic pairs at 1.17/1.04, 1.42/1.36, and 1.73/1.63 V vs. Li+/Li, respectively. The first two pairs can be attributed to the $Nb^{3+}/Nb^{4+}$ redox couple, with the third being ascribed to the $Nb^{4+}/Nb^{5+}$ redox couple. The four subsequent CV cycles show high reversibility and cycle stability of ANO. The high intercalation voltage of ANO eliminates the growth of lithium dendrites and minimizes SEI formation, ensuring safe operation and limited side reactions, even at high rates. FIG. 7B illustrates Galvanostatic charge-discharge of the prepared ANO electrodes cycled from 0.1-5 C in five cycle increments.

In order to facilitate electrode formulation for subsequent cell-level studies, different compositional parameters were varied. More specifically, we tested the effect of the binder by studying electrodes formulated with polyvinylidene fluoride (PVDF) and an aqueous binder based on carboxymethyl cellulose (CMC) and styrene-butadiene rubber (SBR), as both of these binders have been previously used in niobate anode studies. The other parameter that was varied was the active material content and respective binder to carbon additive ratios, with an emphasis on identifying optimal formulation with practical loadings. Throughout the study, the carbon additive was not changed (SUPER C65 carbon black). For the half-cell electrode performance evaluation, electrodes were fabricated with capacity loadings on the order of 0.6-0.75 mAh $cm^{-2}$. The four ANO-based compositions that were evaluated in this study are shown in Table 4.

TABLE 2

Results of the crystal structure analysis by Rietveld refinement of as-synthesized ANO.

| a (Å) | b (Å) | c (Å) | α, γ (°) | β (°) | V ($nm^3$) | Rwp |
|---|---|---|---|---|---|---|
| 15.561248(67) | 3.812895(16) | 20.232341(82) | 90 | 113.043(4) | 1.104652(132) | 0.0969 |

TABLE 3

Fractional atomic parameters of as-synthesized ANO.

| Atom[a] | symmetry | site | x | y | z |
|---|---|---|---|---|---|
| M1 | m | 4i | 0.5661 | 0 | 0.7793 |
| M2 | m | 4i | 0.0970 | 0 | 0.8814 |
| M3 | m | 4i | 0.9659 | 0 | 0.9638 |
| M4 | m | 4i | 0.9668 | 0 | 0.1492 |
| M5 | m | 4i | 0.0962 | 0 | 0.6969 |
| M6 | m | 4i | 0.0987 | 0 | 0.0680 |
| O1 | 2/m | 2d | 0.5000 | 0.5000 | 0.5000 |
| O2 | m | 4i | 0.3643 | 0 | 0.4627 |
| O3 | m | 4i | 0.2277 | 0 | 0.729 |

TABLE 4

Anode Formulations

| Sample | Active Material (wt %) | | Carbon (wt %) | Binder (wt %) | | |
|---|---|---|---|---|---|---|
| | ANO | LTO | C65 | PVDF | CMC | SBR |
| ANO-1 | 89 | 0 | 7 | 0 | 2 | 2 |
| ANO-2 | 80 | 0 | 10 | 0 | 7 | 3 |
| ANO-3 | 89 | 0 | 7 | 4 | 0 | 0 |
| ANO-4 | 93 | 0 | 3.5 | 0 | 13.75 | 1.75 |
| LTO-1 | 0 | 89 | 7 | 0 | 2 | 2 |

Figure 7C:
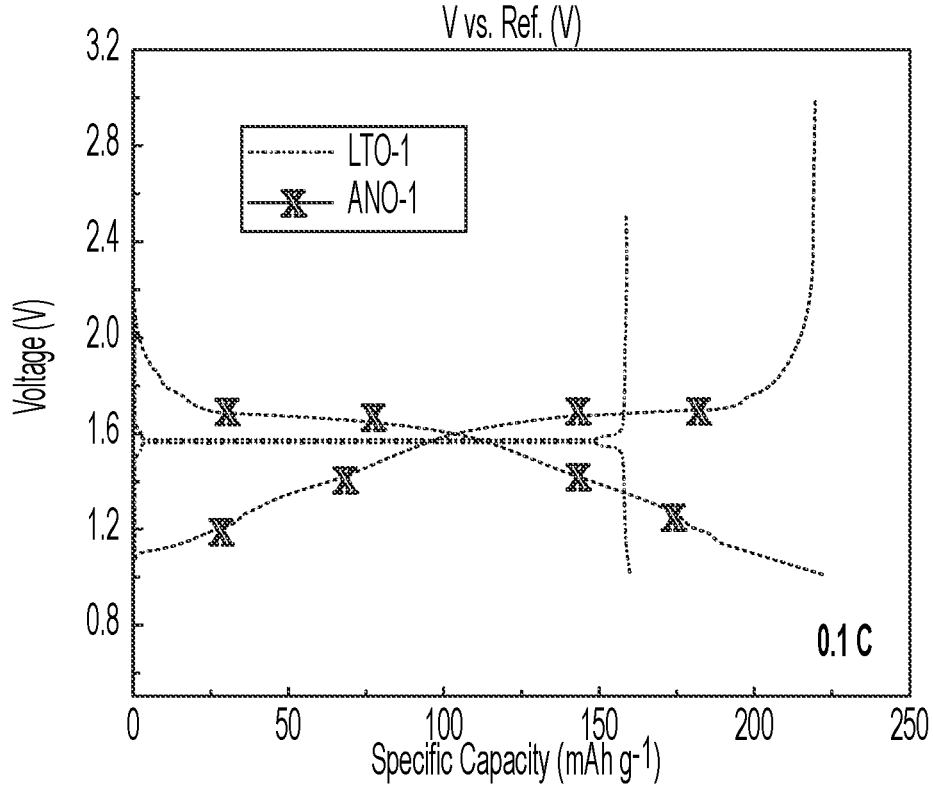
FIG. 7C illustrates comparative charge-discharge profiles between LTO-1 and ANO-1 anodes.
Figure 7D:
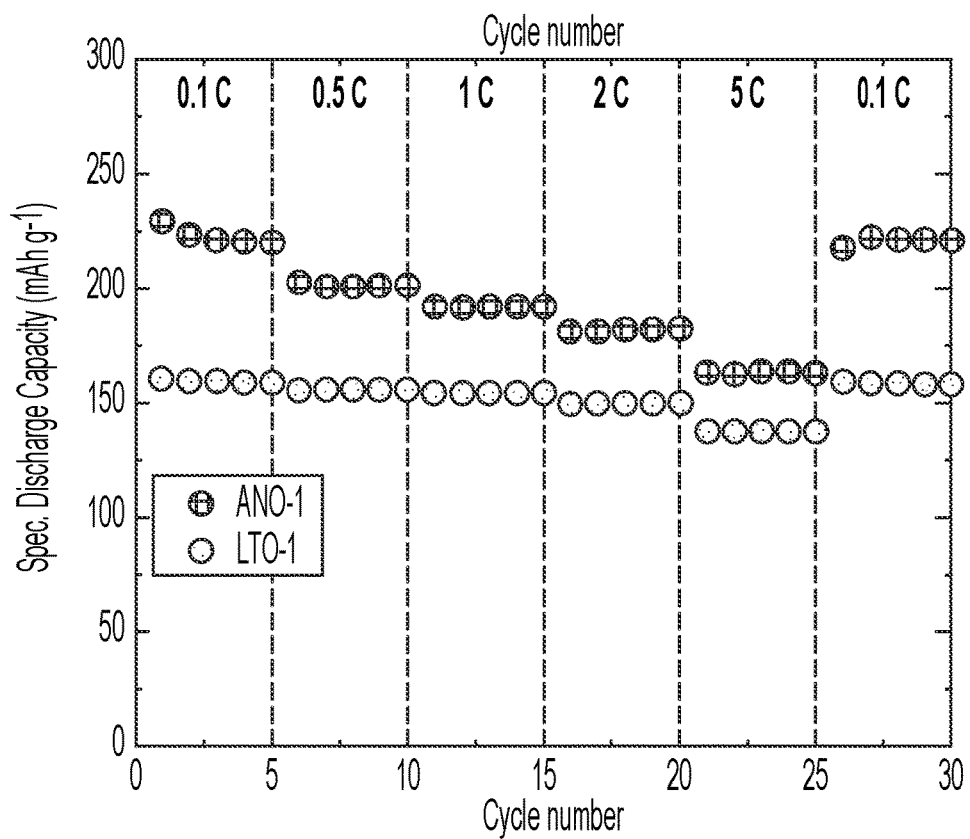
FIG. 7D illustrates rate-capability of ANO-1 and LTO-1 anodes.
Figure 8A:
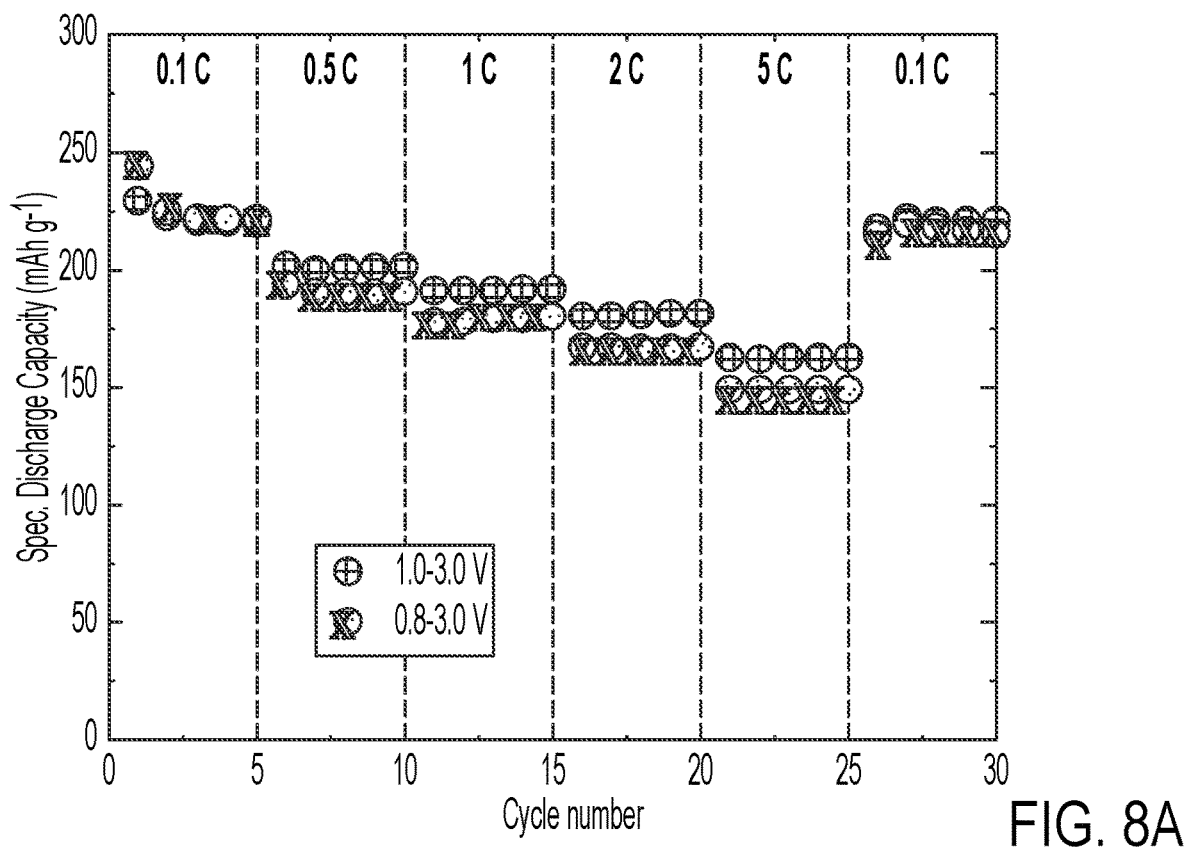
FIG. 8A shows the rate-performance properties for ANO-1/Li half cells evaluated between different discharge cutoff potentials, in which the cutoff voltages of 1.0-3.0 V and 0.8-3.0 V vs. Li/Li+ were used with cells cycled from 0.1-5 C in five cycle increments in accordance with certain embodiments of the invention.
Figure 8B:
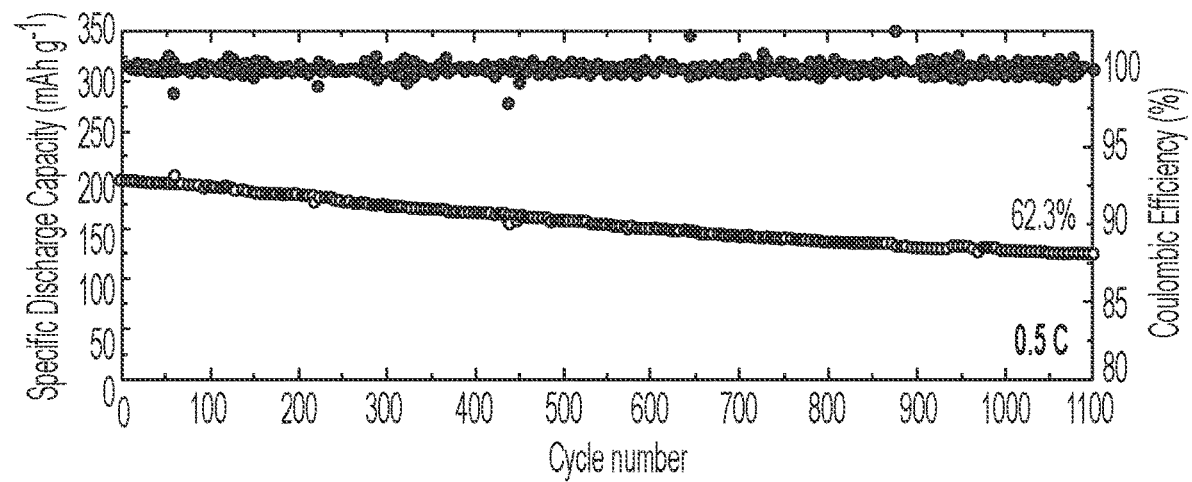
FIG. 8B illustrates long-term cycle stability of ANO-1 electrode at 0.5 C with corresponding Coulombic Efficiency on the secondary y-axis in accordance with certain embodiments of the invention.

FIGS. 7C-7D shows ANO-1 was formulated with 89% active material, 7% carbon black, and 4% binder (2% CMC and 2% SBR). FIG. 7C illustrates comparative charge-discharge profiles between LTO-1 and ANO-1, while FIG. 7D illustrates rate-capability of ANO-1 and LTO-1. Cutoff voltages of 1.0-3.0 V vs. $Li^+/Li$ was used for ANO and 1.0-3.0 V vs. $Li^+/Li$ used for LTO and the capacity values were normalized to the total active mass of the respective electrode. The ANO-1 formulation possesses superior rate performance with a first cycle discharge capacity of 229.5 mAh $g^{-1}$ at 0.1 C. Furthermore, a high Columbic efficiency (CE) of 95.5% was achieved, with a median discharge voltage of 1.57 V vs. $Li^+/Li$. Exceptional reversibility can be seen over subsequent cycles with discharge capacities of 200.3, 191.2, 180.3, and 162.0 mAh $g^{-1}$ at 0.5, 1 C, 2 C, and 5 C, respectively. When the charge potential was decreased from 1.0 to 0.8 V vs. $Li/Li^+$, there was an increase in the initial discharge capacity to 244.0 mAh $g^{-1}$; however, the cycle life diminished faster, losing 9.3% of its initial discharge capacity over the first five cycles vs. 4.1% when discharged to 1.0 V vs. $Li^+/Li$ as illustrated by FIG. 8A. In this regard, FIG. 8A shows the rate-performance properties for ANO-1/Li half cells evaluated between different discharge cutoff potentials, in which the cutoff voltages of 1.0-3.0 V and 0.8-3.0 V vs. Li/Li+ were used with cells cycled from 0.1-5 C in five cycle increments. The capacity values were normalized to the active mass of the respective electrode. FIG. 8B illustrates long-term cycle stability of ANO-1 electrode at 0.5 C with corresponding Coulombic Efficiency on the secondary y-axis. Cutoff voltages of 1.0 and 3.0 V vs. Li/Li+ were used with capacity values normalized to the active mass of ANO-1. Specific discharge capacity shown in solid red circles with Columbic efficiency shown in solid black circles. ANO-3 substituted PVDF binder for the CMC+SBR and showed inferior performance at 5 C, which is attributed to an increase in the polarization that has been reported previously for PVDF compared to CMC+SBR electrode compositions due to improved active material and conductive additive dispersion that leads to enhanced electron conductivity.

Interesting trends were observed when higher or lower active material loadings were used. ANO-2 was based on 80% active loading, 10% carbon black, and 10% binder (7% CMC+3% SBR), while in ANO-4, the active material loading was increased to 93%, with a corresponding 50% reduction in carbon black compared to ANO-1 (3.5%). ANO-2 exhibited comparable capacity to ANO-1 up to a rate of 2 C, after which ANO-1 outperformed ANO-2. This is attributed to a combination of different mechanisms, including higher porosity for ANO-2 due to increased carbon content, which may increase Li-ion diffusion time; and that further carbon additive increase is required to see larger improvement in the rate capability for the ANO synthesized in this work. This performance may further underscore an important interplay between the binder/additive content, composition/density/porosity and the specific, sub-micron particle morphology of the ANO material. Conversely, ANO-4 showed inferior performance at all C-rates. This implies that a limit in the electrical conductivity of ANO may be reached for active loadings exceeding about 90%, in line with previous reports on high loading TNO formulations where a carbon coating was used to improve rate performance. These studies, though not exhaustive, demonstrate the benefits of the synthesized material in this work, as an electrode formulation with very high active material loading of 89% was identified, resulting in very good electrode rate performance. This is the highest active material content reported for aluminum niobates, and is comparable with the active content of carbon-coated TNO formulated explicitly for commercial automotive applications.

Figure 9A:
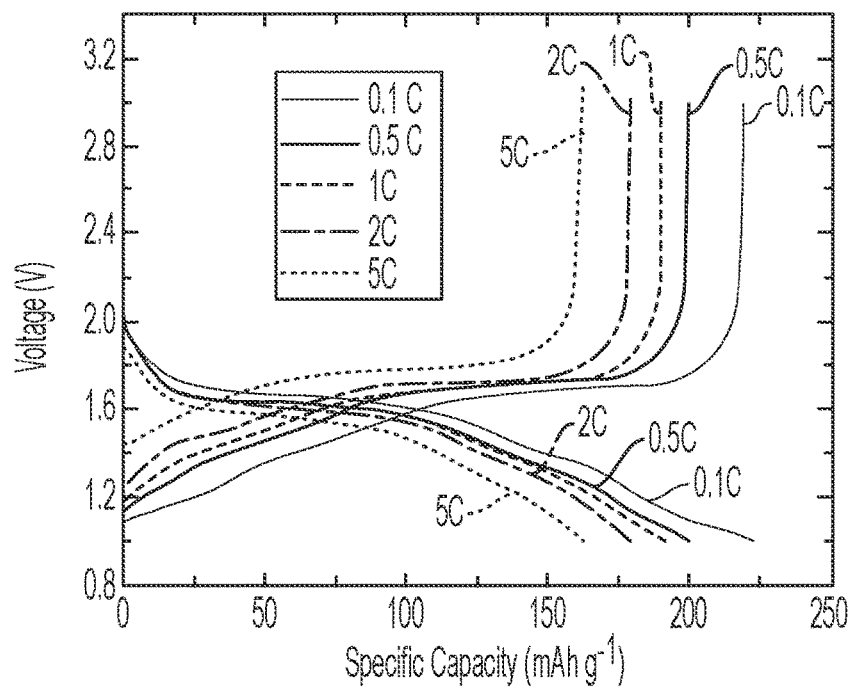
FIG. 9A illustrates galvanostatic charge-discharge curves at various charge rates from 0.1 C to 5 C in accordance with certain embodiments of the invention.
Figure 9B:
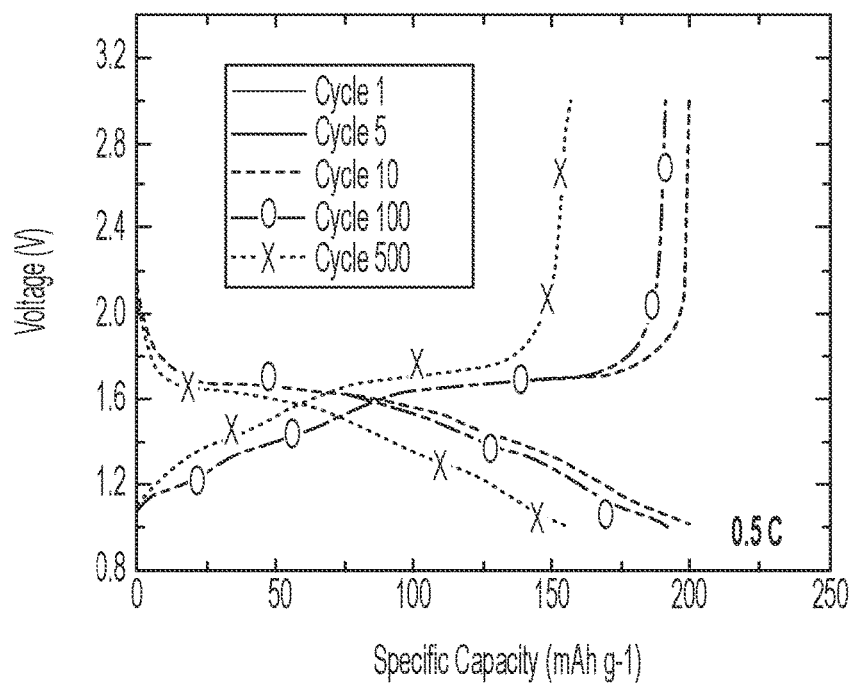
FIG. 9B illustrates galvanostatic cycling profiles for cycles 1, 5, 10, 100, and 500 at 0.5 C in accordance with certain embodiments of the invention.
Figure 9C:
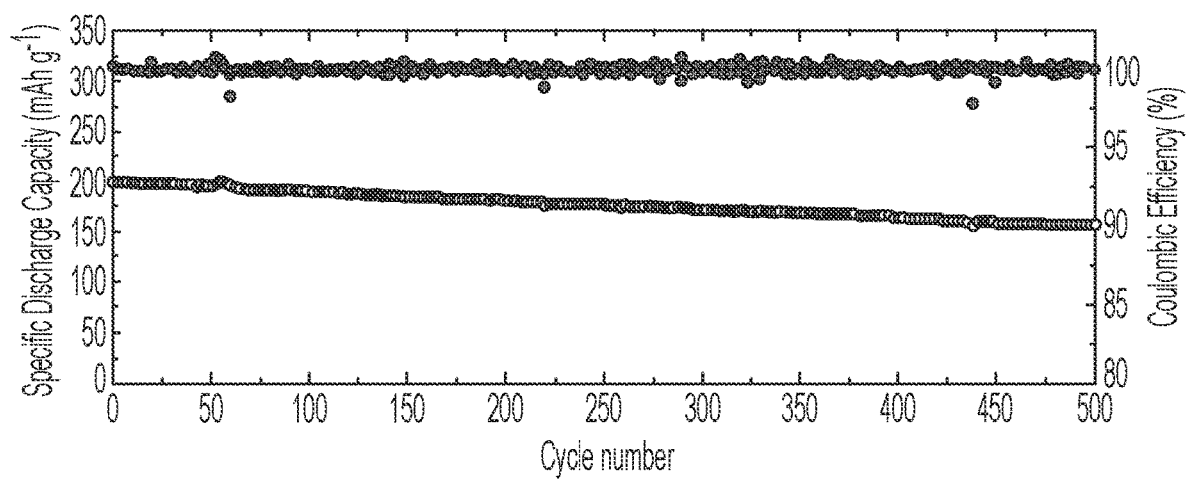
FIG. 9C illustrates long-term cycle stability at 0.5 C with corresponding coulombic efficiency on the secondary y-axis (after rate-capability) in accordance with certain embodiments of the invention.
Figure 10A:
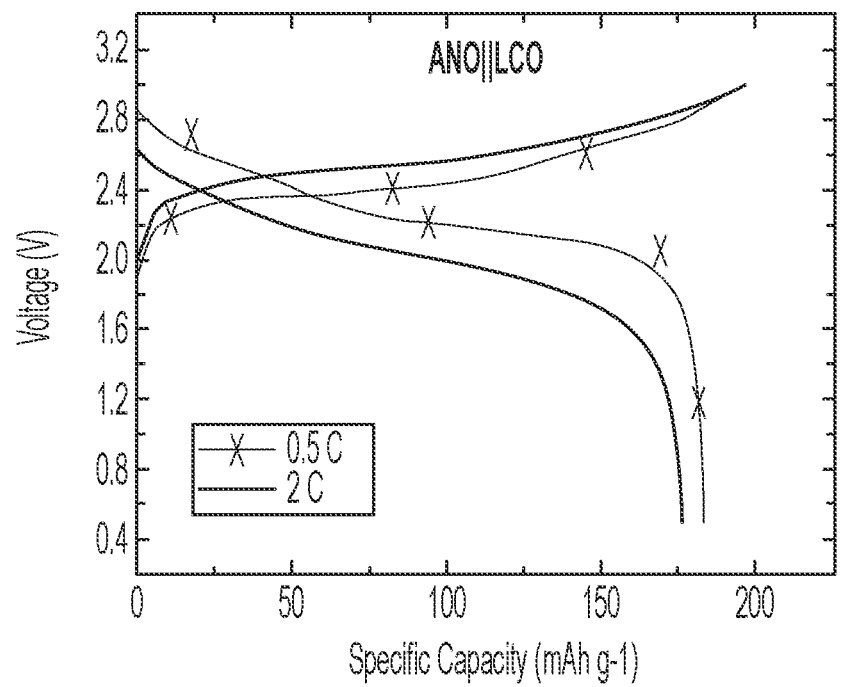
FIG. 10A illustrates charge-discharge profiles of an ANO||LCO cell in accordance with certain embodiments of the invention.
Figure 10B:
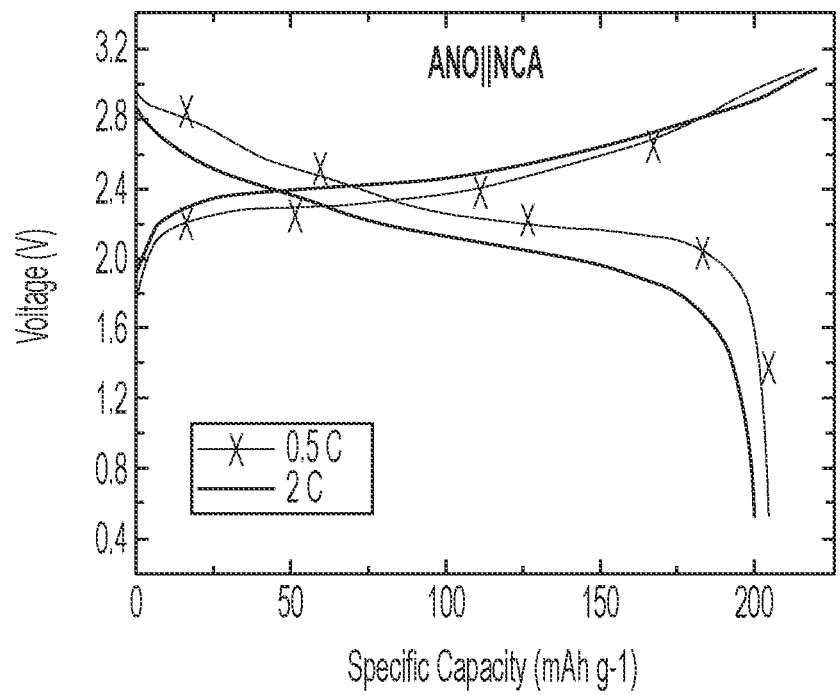
FIG. 10B illustrates charge-discharge profiles of an ANO||NCA cell in accordance with certain embodiments of the invention.

After studying the various electrode formulations for ANO, a comparative study was performed with commercial-grade LTO, which is known for its high rate capability. To ensure accurate comparison, LTO was formulated in an identical manner as shown in Table 4 (LTO-1). The results reveal that even at 5 C, ANO-1 displayed a discharge capacity of 162.7 mAh $g^{-1}$, which is higher than that of the LTO-1 by about 20% at 5 C, and in fact greater than LTO-1 even at 0.1 C (158.8 mAh $g^{-1}$). Furthermore, ANO exhibited over a 43% higher practical capacity when compared to LTO at 0.1 C. The relative rate retention shows a linear decline in capacity in all cases with LTO retaining 85% of its low rate capacity (0.1 C) at a rate of 5 C. In comparison, ANO maintains 73% of its original capacity. It should be emphasized, however, that the LTO used in this work is a fully optimized production-grade material (graciously provided by Saft America), suggesting that further improvement in ANO particle morphology and/or associated electrode formulation may further improve performance under such practical conditions. FIGS. 9A-C illustrate the extended cycle life of ANO-1 at 0.5 C cycling after the initial 30 cycles of rate capability. This demonstrates ANO has excellent cycle stability and rate capability, even at high active material loading, retaining over 78% capacity (156.5 mAh $g^{-1}$) over 500 cycles. This trend continued up to 1100 cycles, maintaining a capacity of 124.6 mAh $g^{-1}$ as illustrated in FIGS. 8A and 8B. When compared to previous reports on niobate anode cycle life at higher C-rates, it is worth noting that the high capacity, high loading ANO reported herein exhibits a capacity loss of 0.034% per cycle, less than that of $Ru_{0.01}Ti_{99}Nb_4O_7$ (0.099% per cycle at 5 C over 100 cycles), $TiNb_{24}O_{62}$ (0.038% per cycle at 10 C over 500 cycles), $Ti_2Nb_{10}O_{29}$ (0.253% per cycle at 5 C over 100 cycles), and $FeNb_{11}O_{29}$ (0.056% per cycle at 10 C over 200 cycles); comparable to that of $GaNb_{11}O_{29}$ (0.033% per cycle at 10 C over 500 cycles). Though previous ANO anodes have reported 0.0136% capacity fade per cycle, these electrodes consisted of only 65% active material and 25% conductive additive, whereas the ANO performance reported herein is based on 89% active material and only 7% conductive additive. FIG. 10A illustrates charge-discharge profiles of an ANO∥LCO cell in accordance with certain embodiments of the invention, while FIG. 10B illustrates charge-discharge profiles of an ANO∥NCA cell in accordance with certain embodiments of the invention.

Figure 11A:
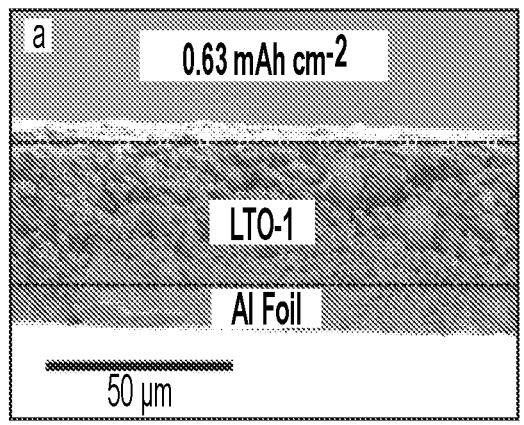
FIG. 11A shows a cross-sectional SEM image of an LTO electrode.
Figure 11B:
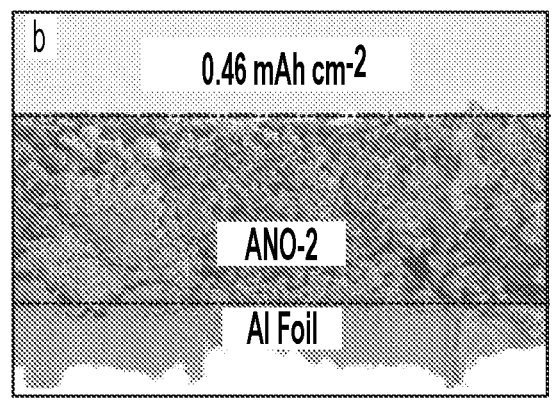
FIG. 11B shows a cross-sectional SEM image of an ANO electrode in accordance with certain embodiments of the invention.
Figure 11C:
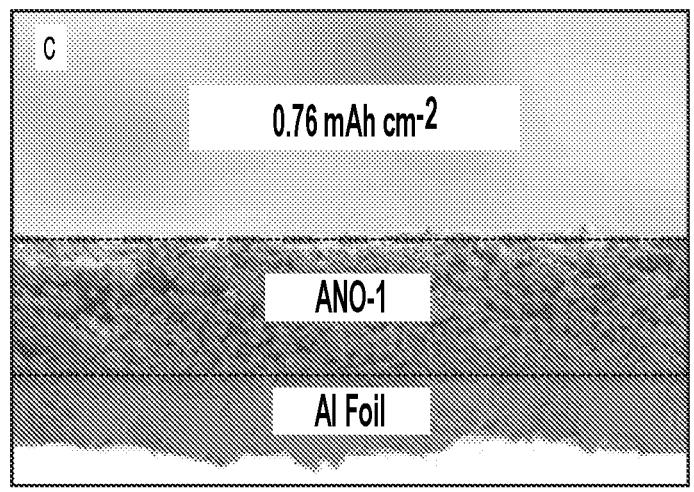
FIG. 11C shows a cross-sectional SEM image of an ANO electrode in accordance with certain embodiments of the invention.

As discussed in the introduction and illustrated in FIG. 1, a significant benefit of ANO is its higher density compared to LTO. To further highlight this effect, FIGS. 11A-C shows the cross-section SEM images of ANO-1, LTO-1, and ANO-2 electrodes, respectively. It is worth noting that these electrodes have been lightly calendered by approximately 10% compared to the as-coated electrode to ensure a balance between removing any loose powder on the surface and maintaining mechanical robustness by not over-pressing to curl the single-side coating. Due to the high-specific energy and high-density, the average thickness of the ANO-1 electrode at 0.76 mAh cm$^{-2}$ is 27 μm, which is much thinner than the 49 μm and 39 μm for ANO-2 (0.46 mAh cm-2) and LTO-1 (0.63 mAh cm-2), respectively. For a comparable porosity between ANO-1 and LTO-1 (about 60% and about 63% respectively), the ANO anode is about 44% thinner. These results validate the importance of high active material content and high-density materials to increase volumetric energy density. Furthermore, this decrease in thickness could improve the electrode's electrical conductivity by bringing the particles closer and reducing the amount of electrolyte needed for wetting, therefore increase the energy density (Wh L$^{-1}$) and specific energy (Wh kg$^{-1}$) of the cell.

Cell Performance

Figure 12A:
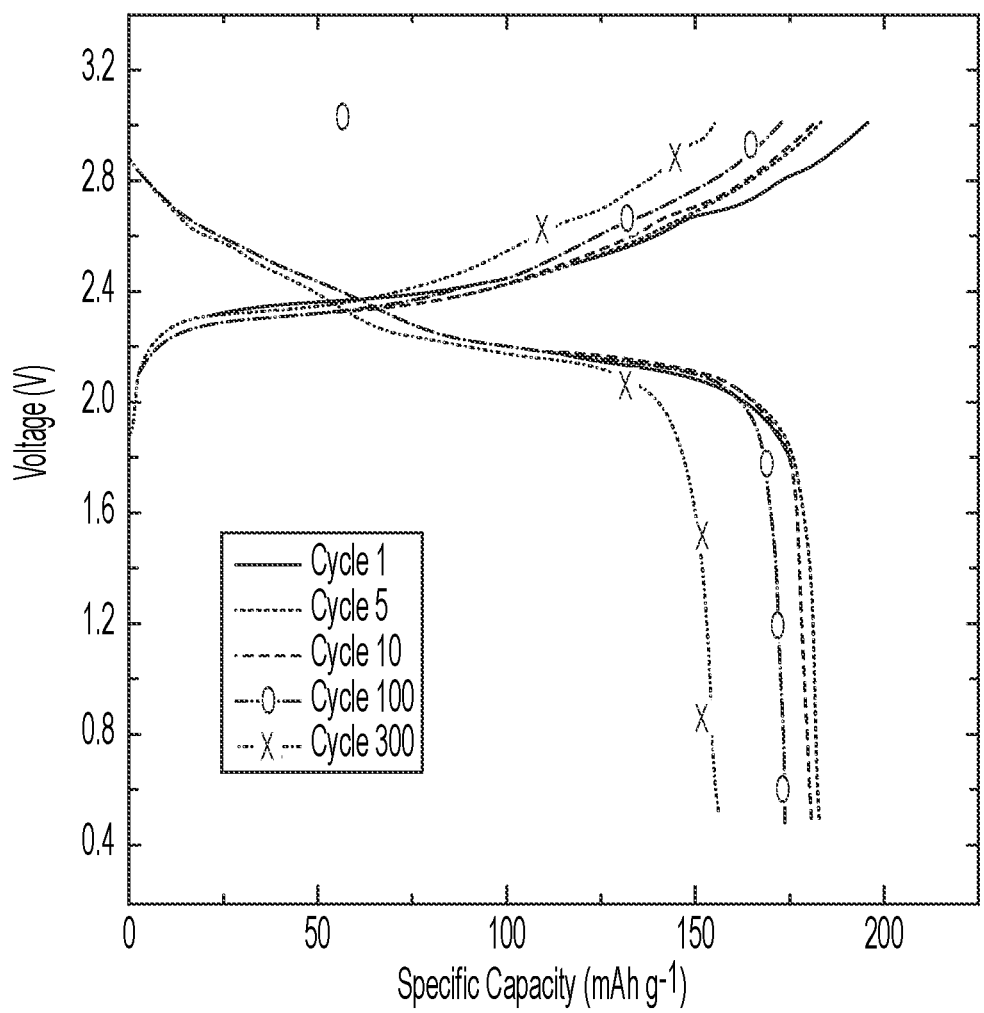
FIGS. 12A-C illustrate galvanostatic charge-discharge curves for ANO||LCO full cells with a N/P ratio of 0.9 (2.17:2.4 mAh cm-2) at different C-rates in accordance with certain embodiments of the invention.
Figure 12B:
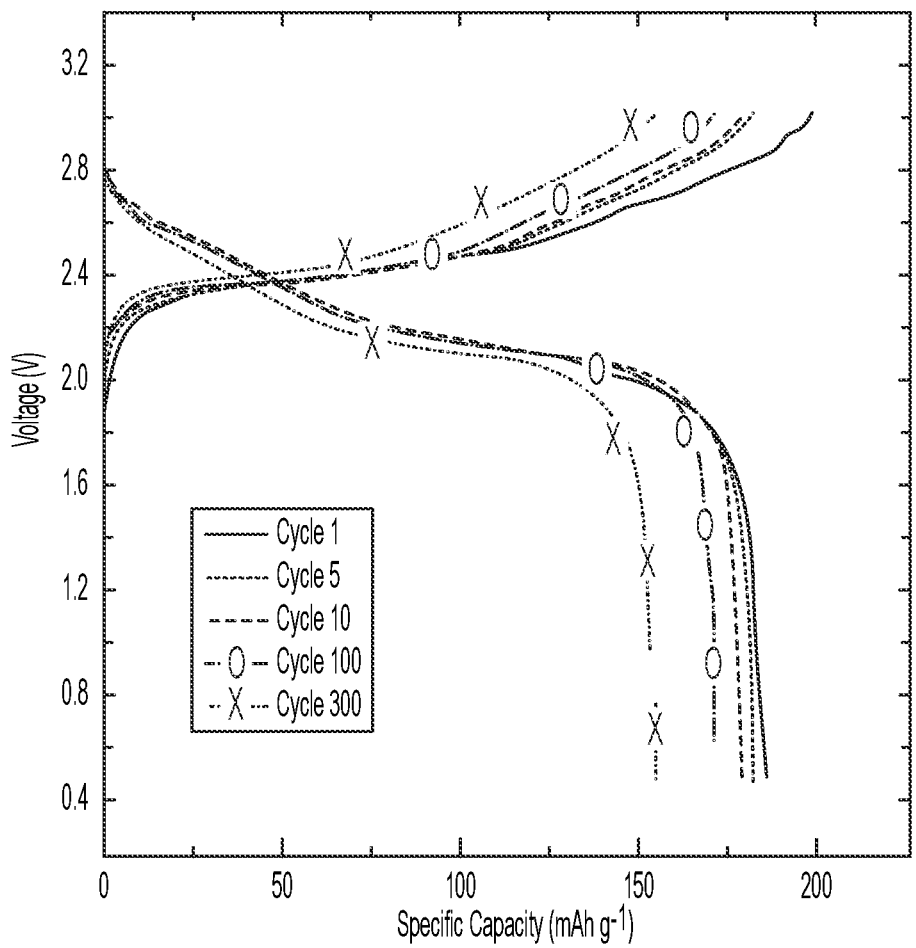
Figure 12C:
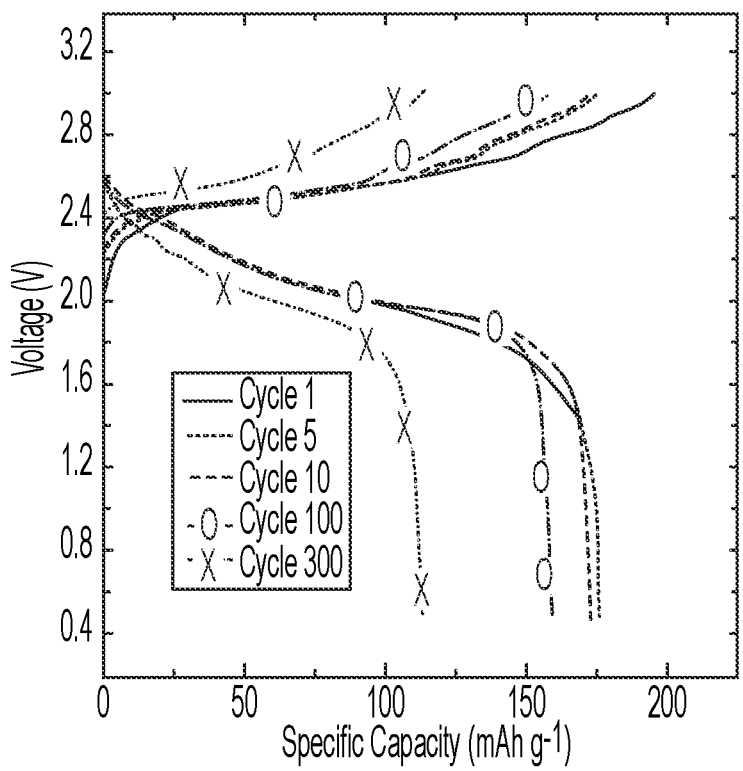
Figure 12D:
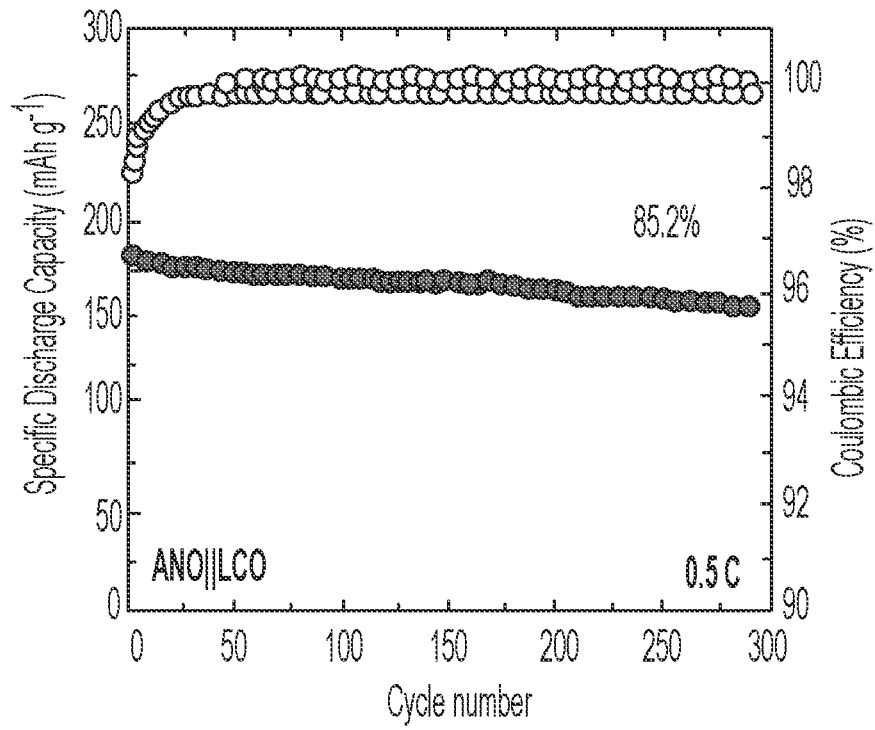
FIGS. 12D-F illustrate corresponding cycle performance for FIGS. 12A-C.
Figure 12E:
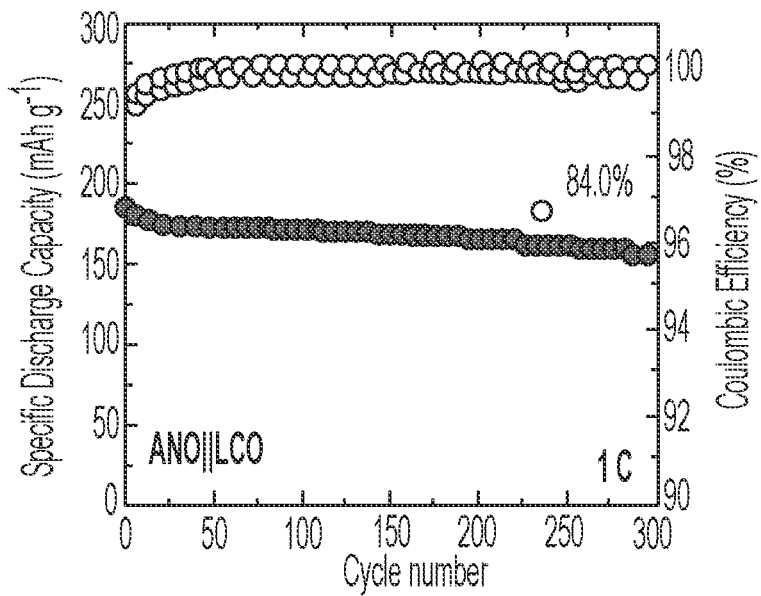
Figure 12F:
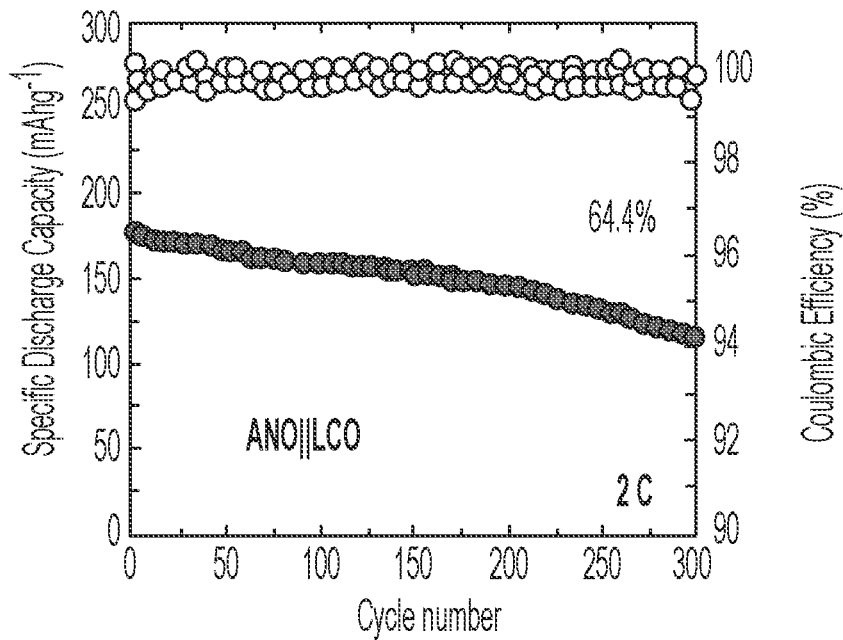
Figure 13A:
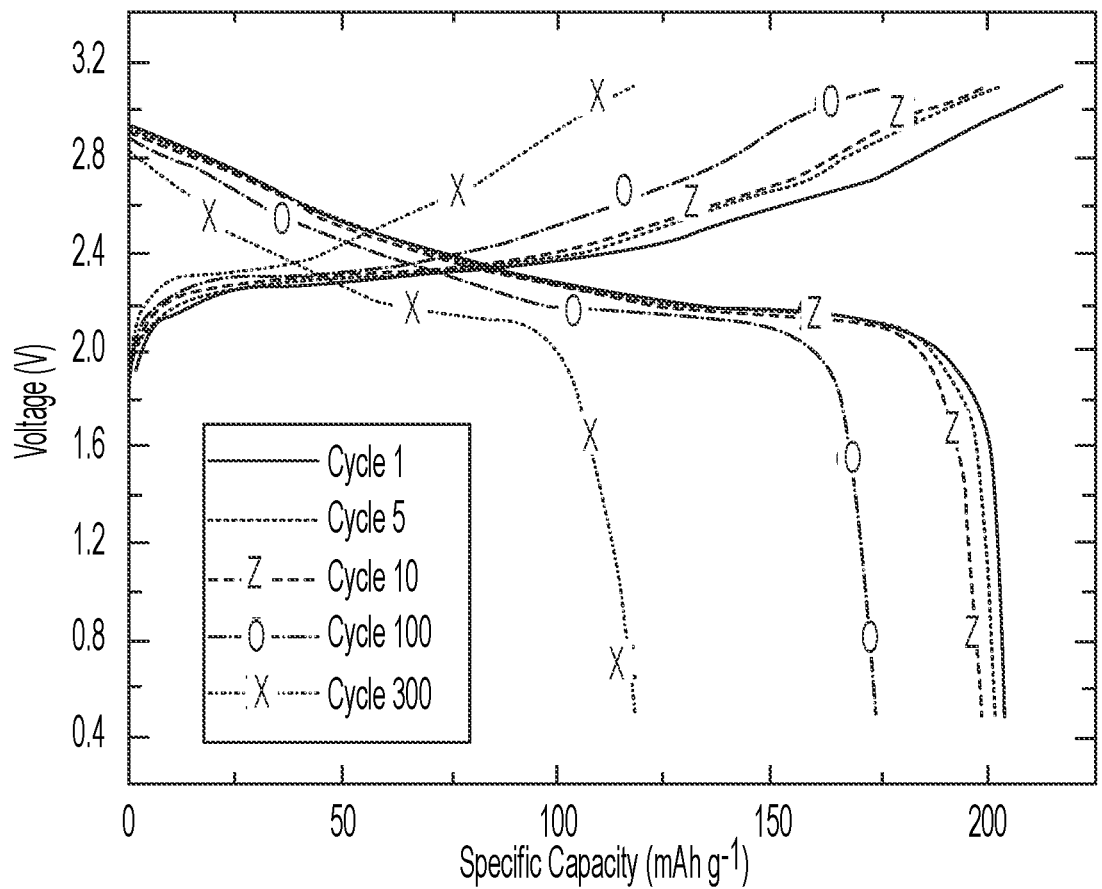
FIGS. 13A-C illustrate galvanostatic charge-discharge curves for ANO||NCA full cells with a N/P ratio of 0.9 (2.17:2.4 mAh cm-2) at different C-rates in accordance with certain embodiments of the invention.
Figure 13B:
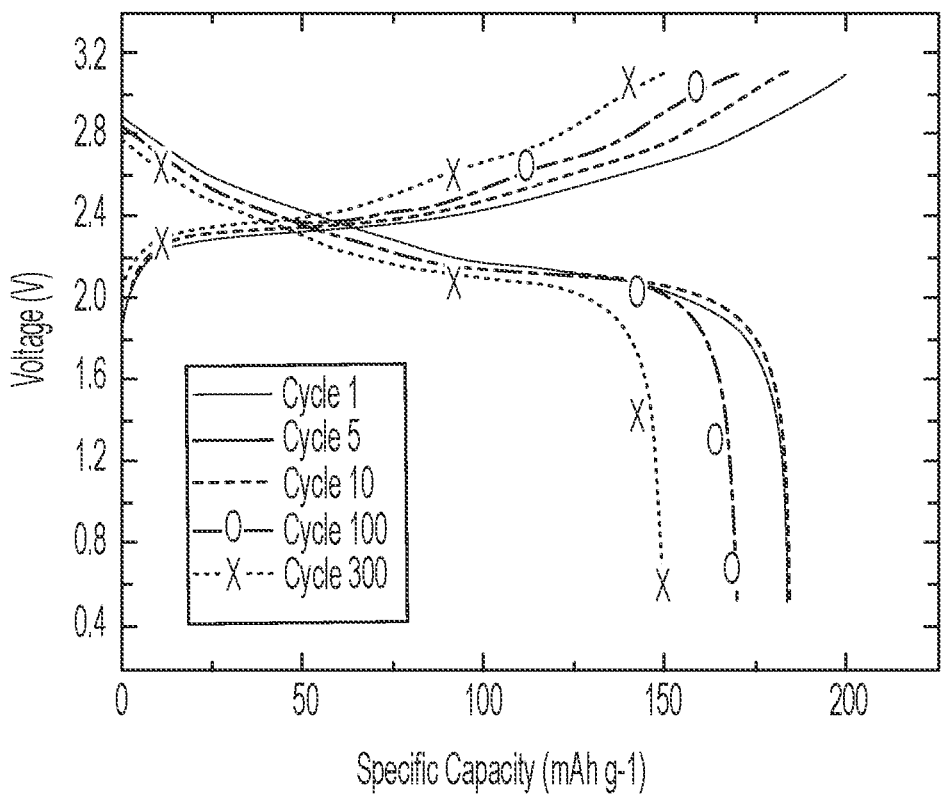
Figure 13C:
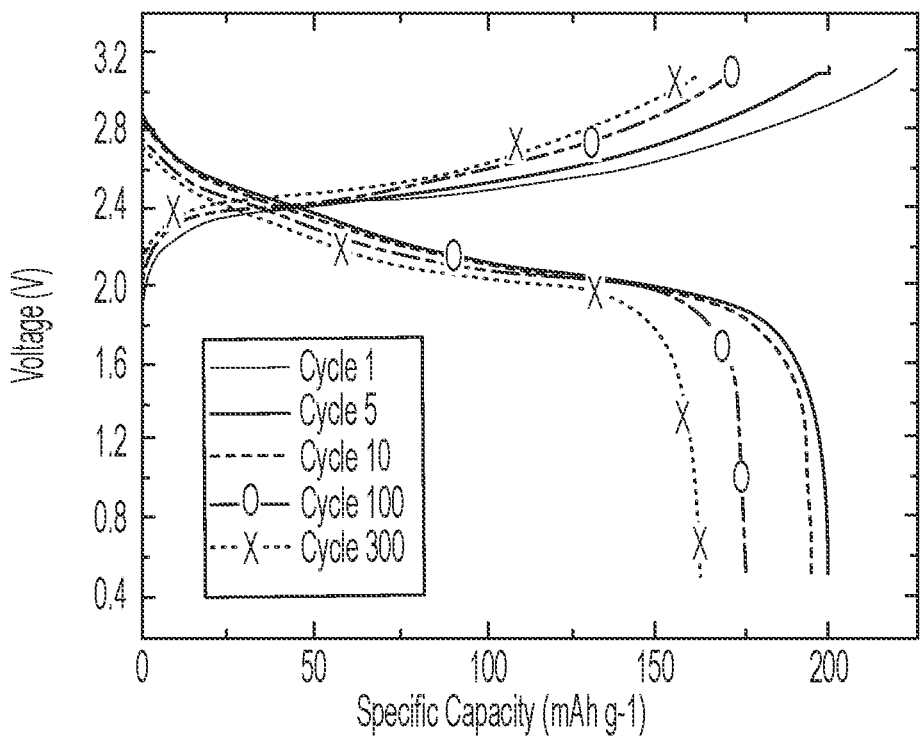
Figure 13D:
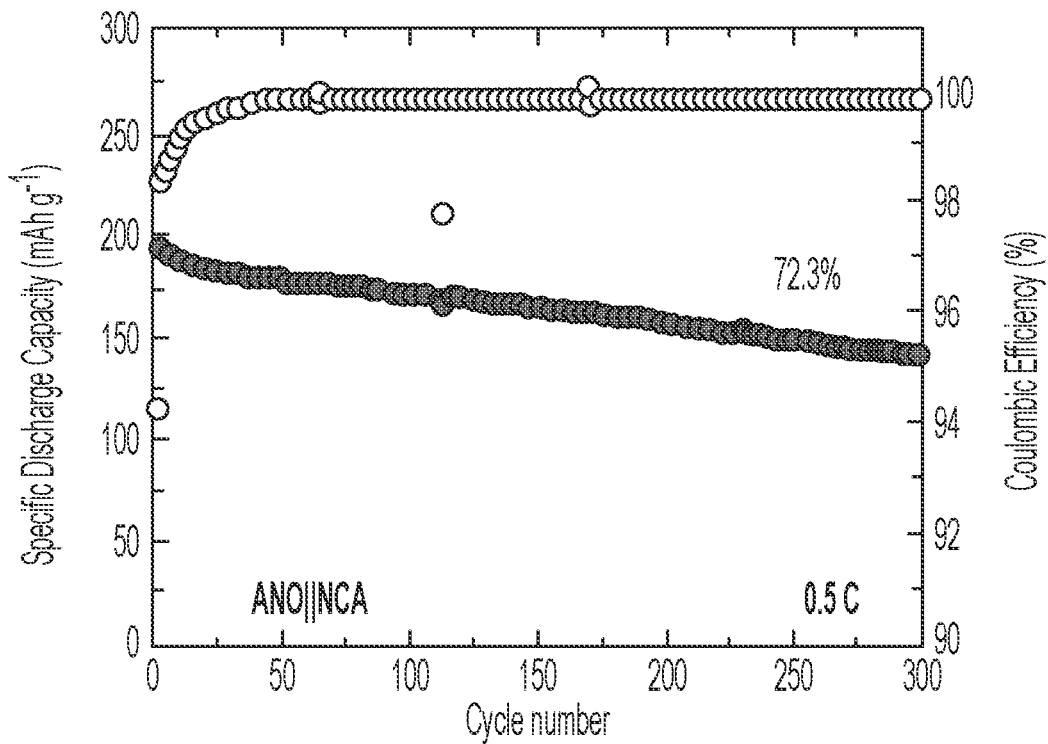
FIGS. 13D-F illustrate corresponding cycle performance for FIGS. 13A-C.
Figure 13E:
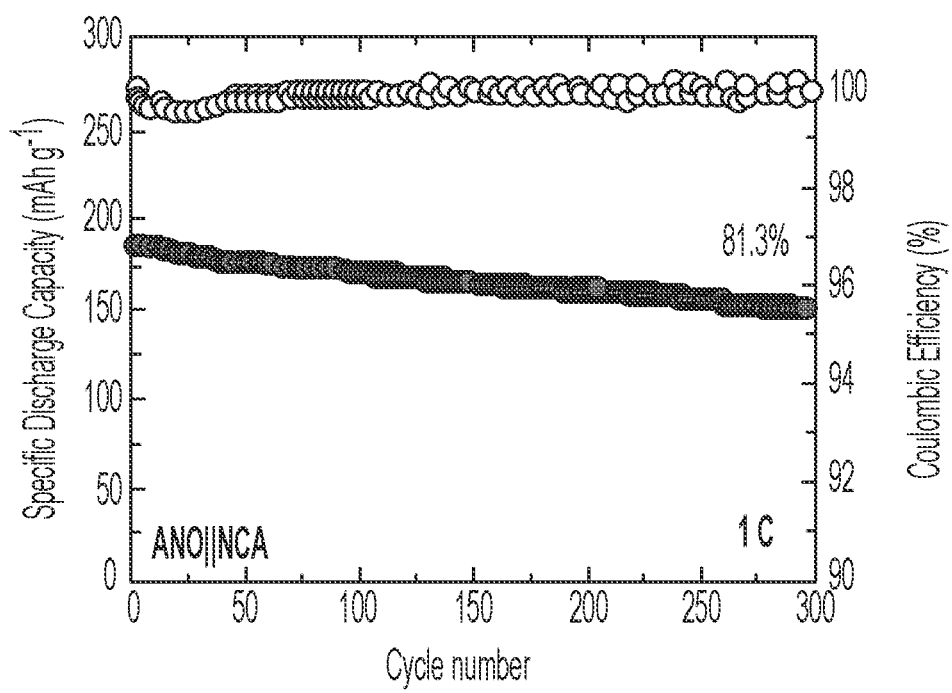
Figure 13F:
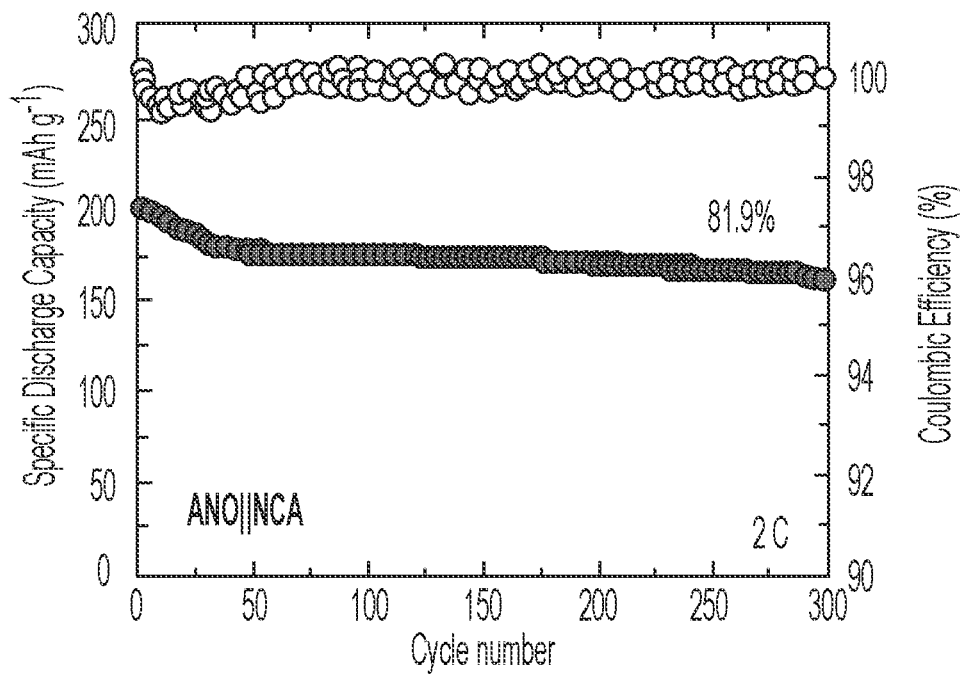

ANO full-cells were assembled with high capacity loadings (2.17 mAh cm$^{-2}$ for ANO) and evaluated with commercially relevant LCO and NCA cathode materials. The assembled cells were anode limited with N/P ratios of 0.9 and cycled at 0.5, 1, and 2 C to evaluate electrochemical performance over a wide range of rates. ANO∥LCO displayed remarkable 1st cycle Coulombic efficiencies (CE) of 93.7, 92.9, and 89.7% at the respective rates of 0.5, 1, and 2 C; at an initial specific discharge capacity of 183.2, 185.1, and 176.5 mAh g$^{-1}$ as illustrated by FIGS. 12A-F. In this regard, FIGS. 12A-F illustrate electrochemical properties of ANO∥LCO full cells with a N/P ratio of 0.9 (2.17:2.4 mAh cm-2). Galvanostatic charge-discharge curves (FIGS. 12A-C) and corresponding cycle performance (FIGS. 12D-F) of cells cycled at 0.5 C (FIGS. 12A and 12D), 1 C (FIGS. 12B and 12E), and 2 C (FIGS. 12C and 12F). Capacity values were normalized to the active mass of ANO. Specific discharge capacity is shown in solid red circles with Columbic efficiency shown in solid black circles. The % of capacity retention is also included in FIGS. 12D-F. Median discharge voltages of 2.22, 2.17, and 2.02 V were observed for the respective rates of 0.5, 1, and 2 C, in agreement with the working voltages for Li$^+$ intercalation/deintercalation potentials for ANO (1.57 V vs. Li$^+$/Li) and LCO ("4.1 V vs. Li$^+$/Li). Full cells delivered CEs greater than 99% on the second cycle at 1 and 2 C, while 0.5 C reached this CE by the 5th cycle and maintained close to 100% CE for all subsequent cycles. After 300 cycles, the cells maintained 85.2% (156.1 mAh g$^{-1}$), 84.0% (155.5 mAh g$^{-1}$), and 64.4% (113.7 mAh g$^{-1}$) of the initial capacity for 0.5, 1, and 2 C, respectively. Similarly, ANO∥NCA displayed 1st cycle CE of 94.2, 92.5, and 90.6% at the respective rates of 0.5, 1, and 2 C; at an initial specific discharge capacity of 194.1, 184.4, and 199.6 mAh g$^{-1}$ as illustrated by FIGS. 13A-F. In this regard, FIGS. 13A-D illustrate electrochemical properties of ANO∥NCA full cells with a N/P ratio of 0.9 (2.17:2.4 mAh cm$^{-2}$). Galvanostatic charge-discharge curves (FIGS. 13A-F) and corresponding cycle performance (FIGS. 13D-F) of cells cycled at 0.5 C (FIGS. 13A and 13D), 1 C (FIGS. 13B and 13E), and 2 C (FIGS. 13C and 13F). Capacity values were normalized to the active mass of ANO. Specific discharge capacity is shown in solid red circles with Columbic efficiency shown in solid black circles. The % of capacity retention is also included in FIGS. 13D-F. Median discharge voltages of 2.26, 2.21, and 2.12 V were observed for 0.5, 1, and 2 C, respectively. At a 0.5 C rate, the full cell retained 72.7% of its initial capacity (141.2 mAh g$^{-1}$) over the first 300 cycles, while at 1 C and 2 C cells retained 81.3% (149.9 mAh g$^{-1}$) and 81.9% (163.4 mAh g$^{-1}$), respectively, over the same cycle duration. The higher working potential displayed in ANO∥NCA cells compared to the ANO∥LCO cells is due to a difference in the upper cutoff voltage (3.1 and 3.0 V, respectively), which was optimized accordingly to decrease cell aging. By increasing the C-rate from 0.1 to 2 C there is an increase in the interfacial resistance, evident in the cell overpotential, which consequently causes a decrease in the cathode capacity. This behavior in LTO-based cells has been described in the literature. While the specific aging mechanisms and full cell operating parameters are important factors for practical full cell performance, they are outside the scope of this investigation.

Figure 14A:
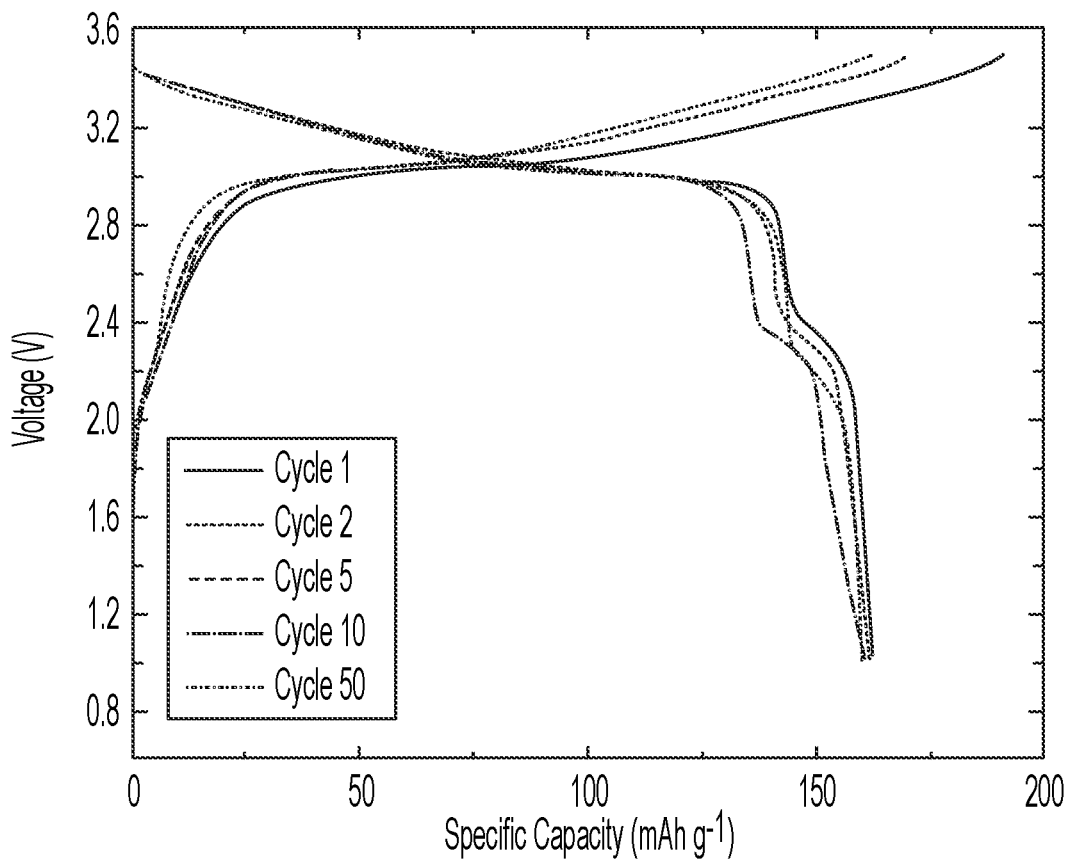
FIG. 14A illustrates illustrate galvanostatic charge-discharge curves for ANO||LNMO full cells in accordance with certain embodiments of the invention.
Figure 14B:
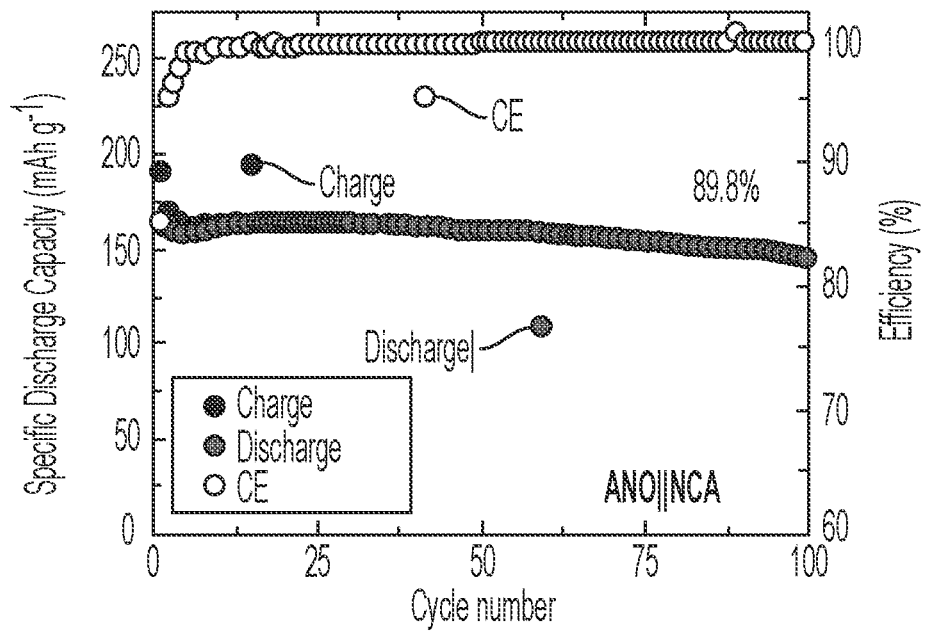
FIG. 14B illustrates the corresponding cycle performance for FIG. 14A.

High voltage LNMO was also evaluated in capacity matched ANO∥LNMO full-cells with N/P ratios of 0.9 as illustrated by FIGS. 14A-B. In this regard, FIGS. 14A-B illustrate electrochemical performance of capacity matched ANO∥LNMO full cells. Galvanostatic charge-discharge curves are illustrated in FIG. 14A and corresponding cycle performance is illustrated in FIG. 14B. Cells were conditioned for three cycles at 0.1 C and then cycled at 0.2 C with capacity values normalized to the active mass of ANO. Specific discharge capacity is shown in solid red circles with columbic efficiency shown in solid black circles. The % of capacity retention is also included. Though LNMO possesses a moderate theoretical specific capacity (147 mAh g$^{-1}$), its Li+ intercalation potential is very high and as such, when paired with high voltage anodes, it can result in cells with high voltage and comparable energy to cobalt-containing cathodes. The ANO∥LNMO cells were evaluated with three formation cycles at 0.1 C, followed by cycling at 0.2 C. The 1st cycle Coulombic efficiencies was a remarkable 85.15% (considering the N/P ratio) with a specific discharge capacity of 162.8 mAh g$^{-1}$ and median cell voltage of 3.06 V. Furthermore, a specific capacity of 146.2 mAh g$^{-1}$ was retained over 100 cycles, corresponding to a capacity retention of 89.8% and a capacity loss of 0.102% per cycle. These results further confirm that ANO has ideal characteristics as an anode material for next-generation LIBs. Overall, the full cell studies presented above represent the first detailed investigation of niobate anode performance under high active material content (89%), high capacity loading (>2 mAh cm$^{-2}$), and capacity matched conditions encountered in practical cells (N/P ratio of 0.9), and further highlight the relevance of these results for advanced energy storage materials and devices.

ANO Electrode and Cell Safety

Figure 15A:
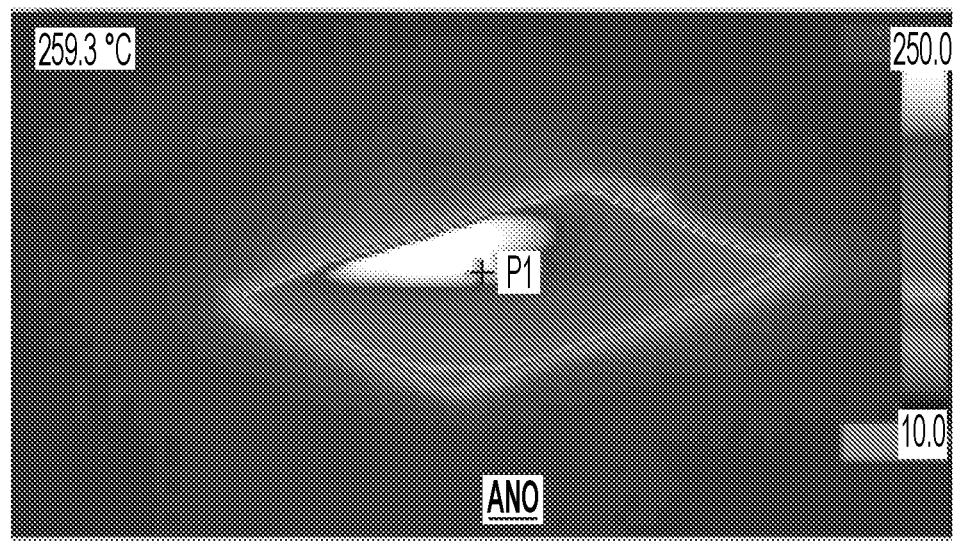
FIG. 15A-C show ambient reactivity of fully charged anode materials corresponding to the highest recorded temperature that was reached during exposure to ambient conditions (42% RH and 22° C.)
Figure 15B:
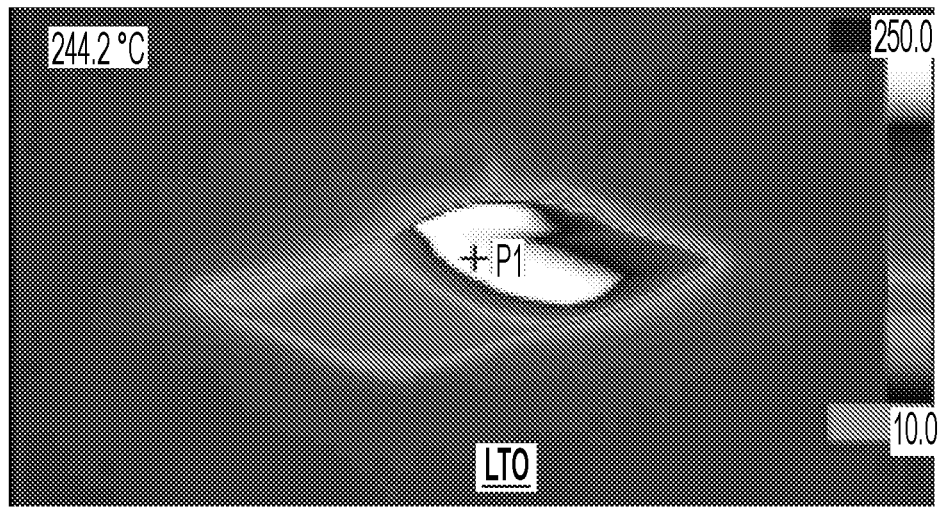
Figure 15C:
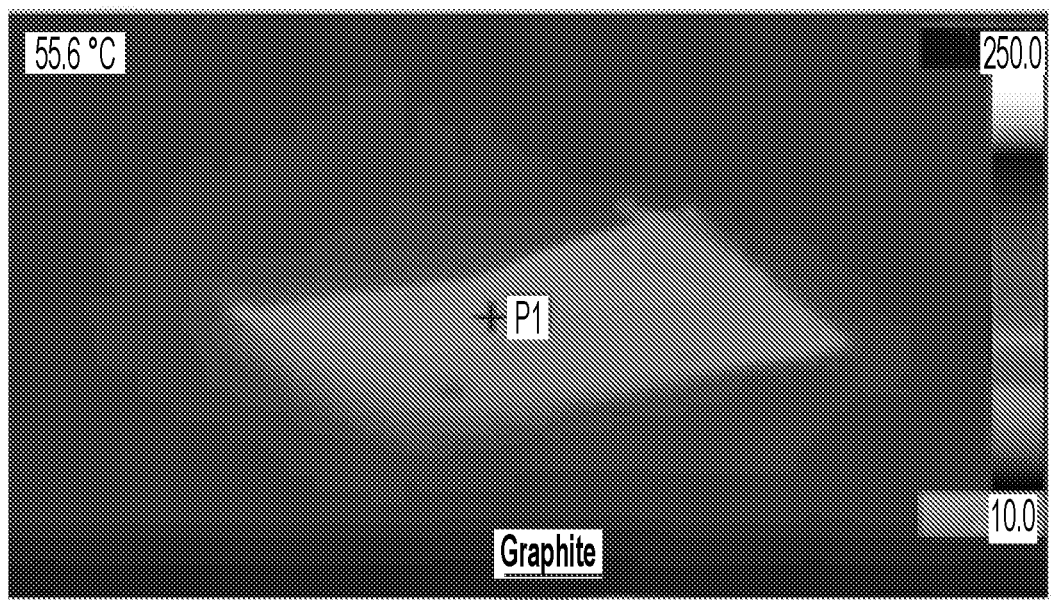

In addition to cell performance, the safety of emerging high energy materials should also be taken into account in new designs and benchmarked against electrodes already in commercial use. Although information has been published on LTO cell safety, no prior reports exist on niobate anodes, with the general assumption that the safe operating voltage above Li-plating may eliminate any safety hazards. The high oxidation state of niobium in the fully charged state, however, warrants further evaluation of the charge electrode and associated cell reactivity. Here we employed thermal imaging to provide a semi-quantitative insight into the reactivity of the charged electrodes when exposed to ambient conditions (representing a worse-case scenario of cell exposure), as well as charge cell response upon nail penetration, a more conventional test used in the evaluation of LIB safety. Full cells were fabricated in multi-layer pouch formats using LCO as the cathode. For comparison, commercial-grade LTO and graphite cells were also constructed and tested. Fully charged anode materials were evaluated in ambient conditions in quadruplicates. FIGS. 15A-C show thermal images of the maximum recorded temperatures, while Table 5 summarizes all the maximum temperature data from all four measurements. In this regard, FIGS. 15A-C illustrate the ambient reactivity of fully charged anode materials, and the images shown correspond to the highest recorded temperature that was reached during exposure to ambient conditions (42% RH and 22° C.). These electrodes were taken from full cells with ~1.9 Wh energy and conditioned for two charge-discharge cycles at 0.1 C followed by a final charge at 0.1 C with a constant voltage taper to 0.02 C. N/P ratios of 1.1 for graphite cells and 0.9 for ANO and LTO cells were employed. Almost unexpectedly, due to its low intercalation potential, graphite showed an average peak temperature of 56.3° C. This may be attributed to the stability of the SEI under ambient conditions, which limits the diffusion of reactive species. Surprisingly, both ANO and LTO showed substantial reactivity to ambient exposure conditions, with similar average peak temperatures of 258.3 and 250.3° C., respectively. As can be seen in the thermal images, smoke is also evident as the reaction progresses. These results demonstrate the high reactivity of LTO and ANO towards ambient conditions reaching temperatures well beyond the autoignition point of common LIB organic electrolytes and high enough to cause shrinkage or melting of separator material and thermal runaway. It should be noted that while exposing fully charged cells to ambient conditions is probably not a commonly encountered scenario, it represents a worse-case possibility. The results from these studies do highlight the inherent reactivity of charged electrodes and that care should be taken considering the use or disposal of such cells.

TABLE 5

Fully charged anode ambient reactivity test results.

| Trial | ANO Temperature (° C.) | LTO Temperature (° C.) | Graphite Temperature (° C.) |
|---|---|---|---|
| 1 | 239.9 | 244.2 | 57.9 |
| 2 | 259.3 | 256.3 | 55.6 |
| 3 | 297.2 | 223.0 | 58.9 |
| 4 | 236.9 | 222.3 | 52.7 |
| Average | 258.3 | 250.3 | 56.3 |

Figure 16A:
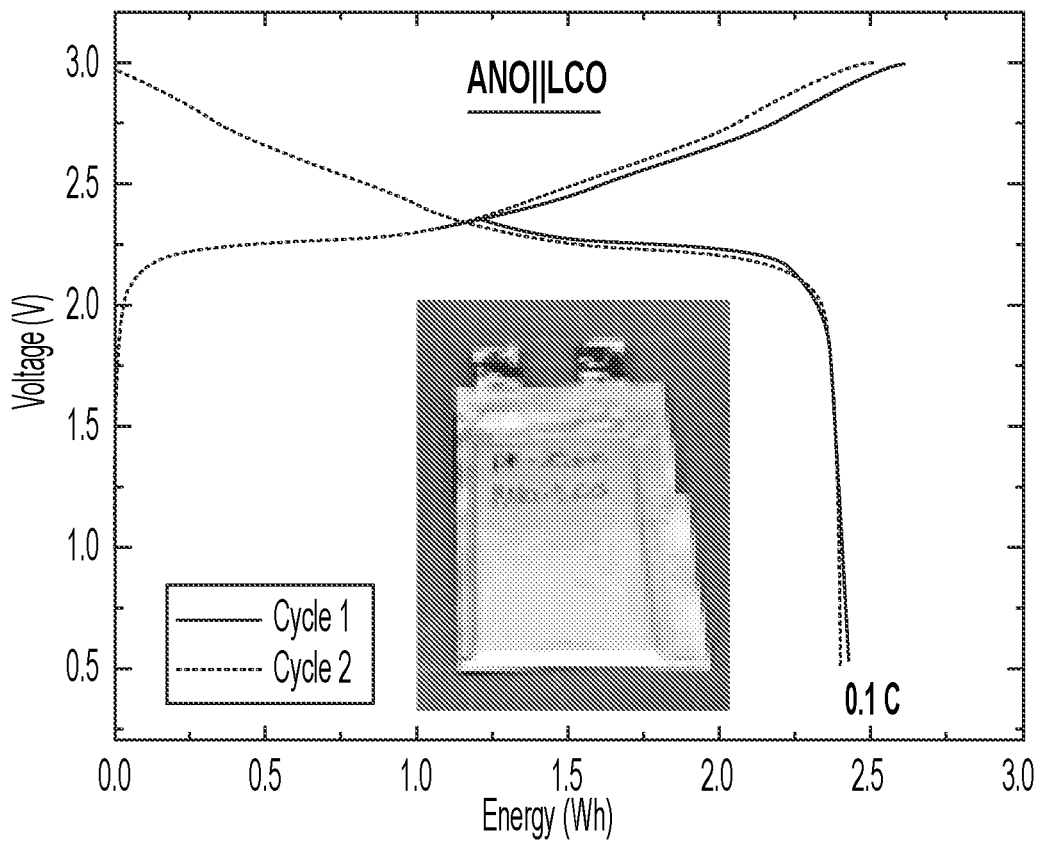
Figure 16B:
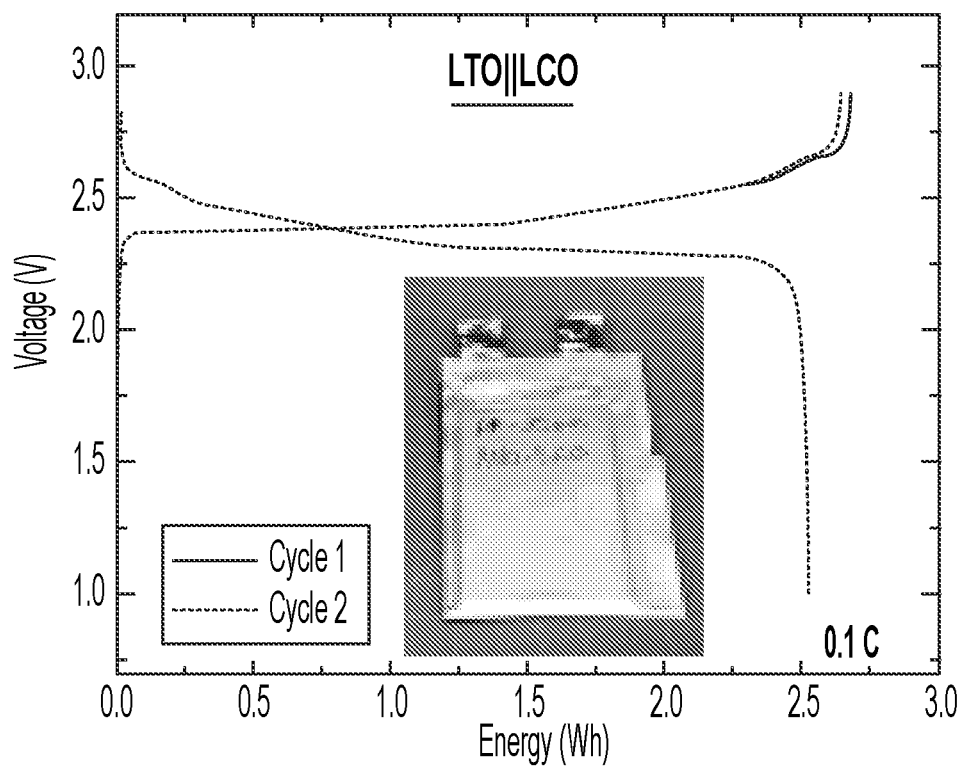
Figure 16C:
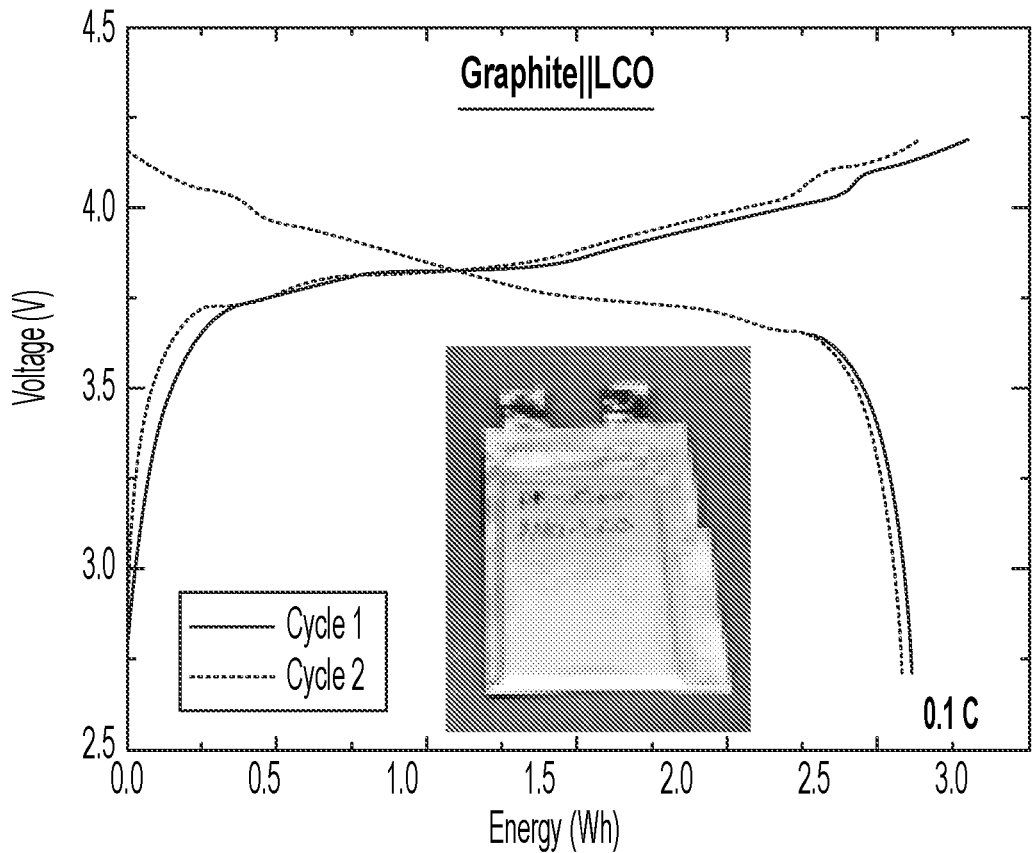
Figure 16D:
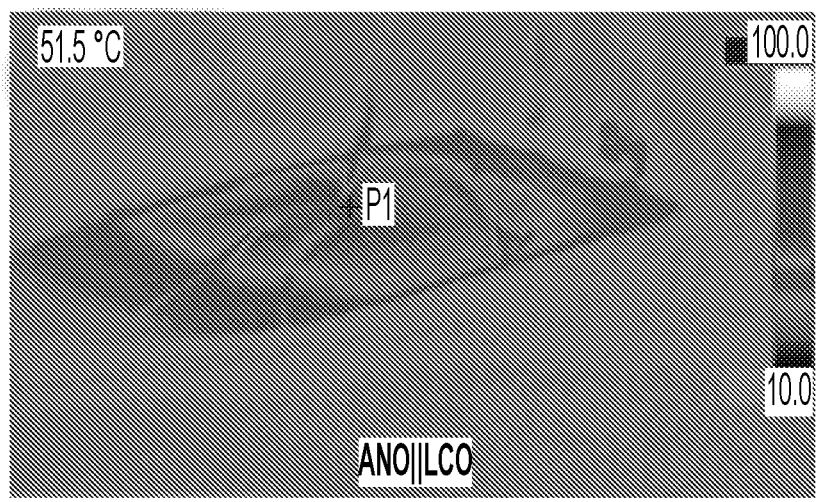
Figure 16E:
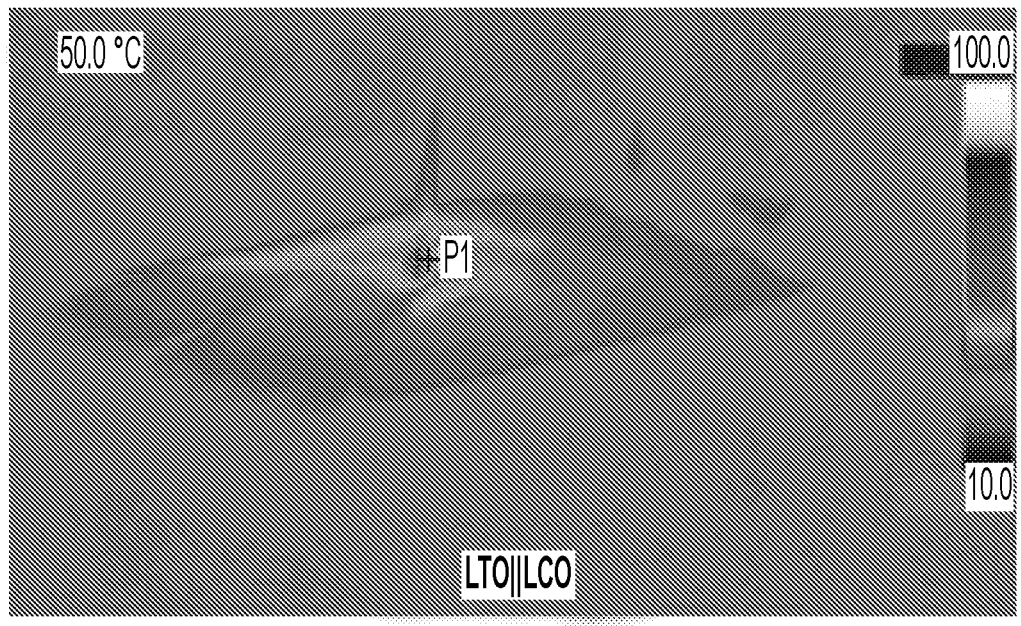
Figure 16F:
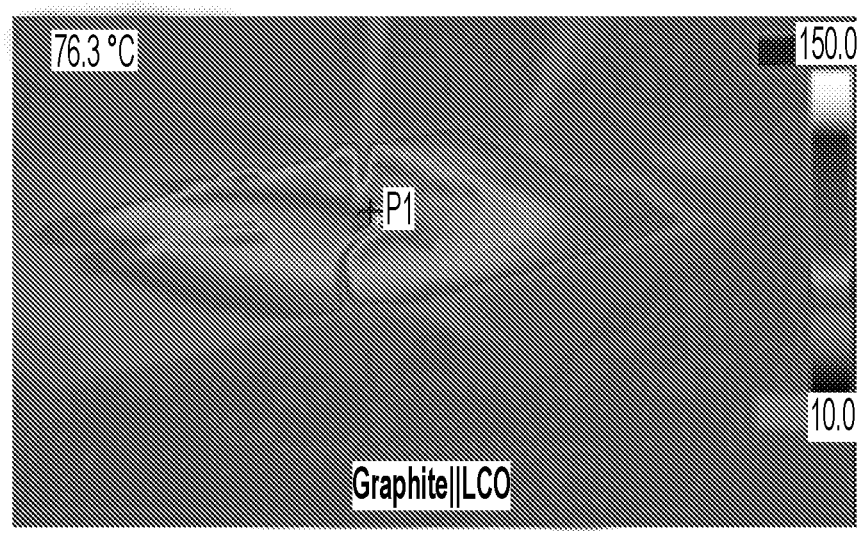

After evaluating the reactivity of individual electrodes, safety was also studied at the cell level using nail penetration. This test represents an acceptable method to evaluate the behavior of a cell during deliberate internal shorting, potentially causing catastrophic thermal runaway. Six 2.5 Wh cells were constructed and conditioned similarly to the individual electrode reactivity test to evaluate thermal profiles during deliberate shorting as illustrated in FIGS. 16A-F. In this regard, FIGS. 16A-F illustrate properties upon nail penetration being performed on fully charged 2.5 Wh full cells. The cells were charged from 0.5-3.0, 1.0-2.9, and 2.7-4.2 for ANO||LCO (FIGS. 16A and 16D), LTO||LCO (FIGS. 16B and 16E), and Graphite||LCO (FIGS. 16C and 16F), respectively. FIGS. 16A-C illustrate the charged-discharge plots for the first two formation cycles in cells with glass fiber separator, while FIGS. 16D-F illustrate thermal imaging snapshots of nail penetration experiments, showing the highest recorded temperature. In this regard, a single nail was driven through the center of the battery into a wooden backing, causing a short circuit, and left within the cell for the duration of the experiment. The test was performed twice on each anode pair, using both a glass fiber separator as in the earlier cell studies, as well as a 25 μm polypropylene separator. A thermal camera and four thermocouples were used to monitor the temperature at different locations of the battery until a consistent drop in temperature was observed. As noted above, FIGS. 16D-F show the maximum cell temperature for cells with a glass fiber separator. The ANO and LTO full cells show similar maximum temperatures of 51.5 and 50.0° C., respectively. However, the 2.5 Wh graphite cell exhibits an increased temperature of 76.3° C., showing higher heat is released during shorting, in line with the higher propensity for thermal issues during rapid discharge of graphite-based cells. Similar trends were obtained with polypropylene separator, though maximum recorded temperatures were lower.

The electrode and cell safety results presented herein shed light on some interesting phenomena that may require further investigation and attention in the energy storage community. Because of the limited capacity loading and energy density and the relatively large surface area of the cells, the graphite cell temperature was not high enough (>130° C.) to trigger thermal runaway. However, given the identical geometry and comparable capacities for all cells in these experiments, the results reported here are still insightful in demonstrating that the graphite cells exhibit much higher temperature rise than the LTO and ANO equivalent full cells within a similar time scale, suggesting that the heat generation was much faster for the graphite cells. This is attributed to the higher cell voltage and corresponding lower operating potential of the graphite anode compared to LTO and ANO. The comparable temperature upon nail penetration between the LTO and ANO cells suggests that their thermal behaviors may be equally comparable in larger cell formats as well.

As discussed above, a new significant finding reported here is the difference in the charged electrode reactivity when exposed to air. LTO/ANO electrodes are actually much more reactive than the charged graphite, which is attributed to the difference in the surface protection of these anode electrodes. Graphite particles are covered with a dense SEI layer while for LTO/ANO electrodes, a much thinner SEI forms due to limited electrolyte reduction at the higher anode operating potentials. When these charged electrodes are exposed to air, the graphite SEI layer insulates the highly reactive lithiated graphite particles from the oxidizing species in air ($O_2$ and $H_2O$). In contrast, for LTO/ANO, in the absence of such protection, the highly reduced oxide particles could be quickly oxidized in air and release a significant amount of energy in a short time. Collectively, these observations that are reported here for the first time to our knowledge, reveal the additional value of the SEI in protecting anode surfaces. Though the safety of niobates (and LTO at similar voltage) may not be a concern under commonly encountered (e.g., overcharge) or extreme abuse conditions (e.g., cell shorting), individual charged electrodes remain highly reactive and this should be taken into account as an additional safety consideration. To avoid any thermal issue from LTO/ANO cells, the direct exposure of the charged electrodes to air should be avoided.

SUMMARY

In summary, we investigated $AlNb_{11}O_{29}$ as a high-performance material for next-generation Li-ion batteries. The scalable and straightforward synthetic method introduced here produced ANO in large quantities that exhibited excellent electrochemical properties, including a high gravimetric capacity of 229.5 mAh $g_{-1}$ at 0.1 C. Furthermore, optimization of electrode formulation allowed for high, commercially relevant loadings that were capable of maintaining a specific capacity of 162.7 mAh $g^{-1}$ at 5 C, which is higher than that of commercial-grade LTO even at 0.1 C (158.8 mAh $g^{-1}$). When cycled at 0.5 C, ANO maintained greater than 80% capacity for >450 cycles. Moreover, the performance was then evaluated in various C-rates in high areal capacity (>2 mAh $cm^{-2}$) full cells with N/P ratios of 0.9 with commercially used cathodes ($LiCoO_2$ and $LiNi_{0.8}Co_{0.15}Al_{0.05}O_2$) and high-voltage $LiNi_{0.5}Mn_{0.5}O_4$. Safety of ANO at the electrode and cell level was compared to commercially used anodes (LTO and graphite), revealing that ANO exhibits similar reactivity in air and under nail penetration to that of LTO. When compared to graphite, ANO shows higher reactivity when fully charged and exposed to air but much lower thermal instability under direct internal short of full cells.

These and other modifications and variations to embodiments of the invention may be practiced by those of ordinary skill in the art without departing from the spirit and scope of the invention, which is more particularly set forth in the appended claims. In addition, it should be understood that aspects of the various embodiments may be interchanged in whole or in part. Furthermore, those of ordinary skill in the art will appreciate that the foregoing description is by way of example only, and it is not intended to limit the invention as further described in such appended claims. Therefore, the spirit and scope of the appended claims should not be limited to the exemplary description of the versions contained herein.

What is claimed is:

1. An anode, comprising: an anode-composition including an active anode species comprising at least one niobate compound, the at least one niobate compound comprising at least one transition-metal-niobate (TMN), at least one post-transition-metal-niobate (PTMN), or both, wherein the at least one niobate compound is prepared by:
   (i) providing a water-soluble niobium-containing source;
   (ii) providing a transitional metal source (TMS), a post-transitional metal source (PTMS), or both;
   (iii) dissolving (a) the water-soluble niobium-containing source, and (b) the TMS, the PTMS, or both in an aqueous medium to form an intermediate aqueous solution;
   (iv) forming an intermediate paste by admixing an inert support material with the intermediate aqueous solution, wherein the inert support material comprises a plurality of particles having an average diameter from about 5 nm to about 200 nm;
   (v) optionally coating the intermediate paste on a support substrate; and
   (vi) removing the inert support material by subjecting the intermediate paste to a calcination process and providing the TMN and/or the PTMN.

2. The anode of claim 1, wherein the anode composition comprises from about 80 wt. % to about 95 wt. % of the at least one niobate compound.

3. The anode of claim 1, wherein the at least one niobate compound comprises a titanium niobate, a copper niobate, a tungsten niobate, an aluminum niobate, or any combination thereof.

4. The anode of claim 1, wherein the water-soluble niobium-containing source is a water-soluble niobium oxalate.

5. The anode of claim 1, wherein the TMS comprises one or more of titanium, copper, and tungsten, and the PTMS comprises aluminum.

6. The anode of claim 1, further comprising adding an organic acid during step (iii).

7. The anode of claim 6, wherein the organic acid comprises oxalic acid.

8. The anode of claim 1, wherein the inert support material comprises a material that does not react with (i) the niobium-containing source or (ii) the TMS or PTMS.

9. The anode of claim 8, wherein the inert support material comprises a plurality of particles.

10. The anode of claim 9, wherein the inert support material comprises carbon black.

11. The anode of claim 1, wherein the intermediate paste comprises from about 20 wt. % to about 80 wt. % on a dry basis of the inert support material.

12. The anode of claim 11, wherein the intermediate paste comprises a diphasic system containing both a liquid phase comprising the intermediate aqueous solution and a solid phase comprising the inert support material.

13. The anode of claim 1, wherein
the at least one niobate compound is further prepared by a step of drying the intermediate paste prior to the calcination process to form a dry-intermediate paste, wherein the dry-intermediate paste comprises from about 0 to about 5 wt. % of water, and
the calcination process comprises subjecting the intermediate paste to a calcination temperature from about 800° C. to about 1400° C.

14. The anode of claim 1, wherein the TMN comprises a titanium niobate, a copper niobate, or a tungsten niobate, and the PTMN is an aluminum niobate.

15. The anode of claim 1, wherein the TMN, the PTMN, or both comprise a plurality of particulates having an average diameter from about 1 to about 100 microns.

16. The anode of claim 15, wherein the plurality of particulates comprise a platelet-like morphology having an aspect ratio from about 2:1 to about 20:1.

17. The anode of claim 1, wherein the water-soluble niobium-containing source is a niobium (V) oxalate hydrate.

* * * * *